(12) United States Patent
Kondo et al.

(10) Patent No.: US 12,424,636 B2
(45) Date of Patent: Sep. 23, 2025

(54) CARBON-BASED SOLID ACID

(71) Applicant: NISSAN CHEMICAL CORPORATION, Tokyo (JP)

(72) Inventors: Shoichi Kondo, Funabashi (JP); Taichi Nakazawa, Funabashi (JP); Takamasa Kikuchi, Funabashi (JP); Yuki Nohara, Funabashi (JP); Mitsuyoshi Kawashima, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 1011 days.

(21) Appl. No.: 17/441,418

(22) PCT Filed: Mar. 23, 2020

(86) PCT No.: PCT/JP2020/012658
§ 371 (c)(1),
(2) Date: Sep. 21, 2021

(87) PCT Pub. No.: WO2020/196383
PCT Pub. Date: Oct. 1, 2020

(65) Prior Publication Data
US 2022/0173409 A1    Jun. 2, 2022

(30) Foreign Application Priority Data

Mar. 22, 2019  (JP) .................................. 2019-054792
Apr. 17, 2019  (JP) .................................. 2019-078290

(51) Int. Cl.
*H01M 4/90* (2006.01)
*C01B 32/194* (2017.01)
(Continued)

(52) U.S. Cl.
CPC ......... *H01M 4/9008* (2013.01); *C01B 32/194* (2017.08); *H01M 4/8668* (2013.01);
(Continued)

(58) Field of Classification Search
CPC ............. H01M 4/8668; H01M 4/9075; H01M 4/9083; H01M 2008/1095
See application file for complete search history.

(56) References Cited

U.S. PATENT DOCUMENTS

2006/0276668 A1   12/2006  Domen et al.
2015/0280246 A1*  10/2015  Kato ................... H01M 4/8803
                                                        502/201
2016/0190602 A1   6/2016  Ishida et al.

FOREIGN PATENT DOCUMENTS

CN         105314630       *  2/2016
CN         105314630 A        2/2016
(Continued)

OTHER PUBLICATIONS

English translation of CN Publication 105314630, Feb. 2016.*
(Continued)

*Primary Examiner* — Brittany L Raymond
(74) *Attorney, Agent, or Firm* — Birch, Stewart, Kolasch & Birch, LLP

(57) ABSTRACT

Provided is a material which can be used in a catalyst layer for a fuel cell and exhibits proton conductive properties. The present invention is directed to a carbon-based solid acid comprising a carbon material having a sulfonic acid group through a linker.

13 Claims, 5 Drawing Sheets

(51) Int. Cl.
  *H01M 4/86* (2006.01)
  *H01M 8/10* (2016.01)
(52) U.S. Cl.
  CPC ....... *H01M 4/9075* (2013.01); *C01P 2002/82* (2013.01); *C01P 2004/04* (2013.01); *C01P 2006/40* (2013.01); *H01M 2008/1095* (2013.01)

(56) References Cited

FOREIGN PATENT DOCUMENTS

| | | |
|---|---|---|
| CN | 106784950 A | 5/2017 |
| JP | 2007-161511 A | 6/2007 |
| JP | 4041409 B2 | 1/2008 |
| JP | 2009-214051 * | 9/2009 |
| JP | 2009-214051 A | 9/2009 |
| JP | 4582546 B2 | 11/2010 |
| JP | 4925399 B2 | 4/2012 |
| JP | 5017902 B2 | 9/2012 |
| JP | 5182987 B2 | 4/2013 |
| JP | 2014-82077 A | 5/2014 |
| JP | 5528036 B2 | 6/2014 |
| WO | WO 2005/029508 A1 | 3/2005 |
| WO | WO 2015/019953 A1 | 2/2015 |

OTHER PUBLICATIONS

English translation of JP Publication 2009-214051, Sep. 2009.*
"Shokubai Chousei Handobukku (How to Prepare Heterogeneous and Homogeneous Catalysts)", edited under the supervision of Masakazu Iwamoto, NTS Inc. (Tokyo), 2011, pp. 634-635.
International Search Report, issued in PCT/JP2020/012658, PCT/ISA/210, dated Jun. 2, 2020.
Perry et al., "A Historical Perspective of Fuel Cell Technology in the 20th Century", Journal of The Electrochemical Society, 2002, vol. 149, No. 7, p. S59-S67.
Written Opinion of the International Searching Authority, issued in PCT/JP2020/012658, PCT/ISA/237, dated Jun. 2, 2020.

* cited by examiner

CARBON-BASED SOLID ACID

FIELD OF THE INVENTION

The present invention relates to a carbon-based solid acid.

BACKGROUND ART

A solid acid has an anionic site for fixing hydrogen ions in the structure thereof, and, when subjected to ion exchange in an aqueous solution containing metal cations, such as metal ions or complex ions, the solid acid can have metal ions fixed to the anionic site. With respect to the solid acid, there are types of an organic solid acid and an inorganic solid acid. As an example of the organic solid acid, there can be mentioned an ion-exchange resin having in the molecule thereof an acid group, such as a sulfonic acid group or a carboxyl group, and the acid group serves as an anionic site for fixing a metal species. The organic solid acid is advantageous in that an acid group is easily introduced into the resin, enabling easy increase of the anionic sites, but has many problems about the heat resistance, durability, and chemical resistance. On the other hand, inorganic solid acids, such as aluminum oxide, vanadium oxide, silica-alumina, and zeolite, have advantageous features in that they have high heat resistance and in that they are unlikely to be damaged by a solvent, but have less anionic sites, and therefore it is difficult for the inorganic solid acid to achieve higher ion exchange ability and higher ionic conduction than those of the organic solid acid.

Patent documents 1 to 3 have reported that amorphous carbon obtained through carbonization, sulfonation, and condensation of rings by subjecting an organic compound to heating treatment in concentrated sulfuric acid or fuming sulfuric acid can be used as a solid acid. This solid acid is called a carbon-based solid acid or a carbon solid acid. Non-patent document 1 has reported that the graphene sheet which has been sulfuric acid treated as reported in patent documents 1 to 3 is a carbon-based solid acid having a sulfonic acid group, a carboxylic acid group, and a phenolic hydroxyl group in the graphene sheet.

With respect to the report on the use and application of the above-mentioned carbon-based solid acid, for example, patent documents 1 to 3 have reported that the carbon-based solid acid is a solid acid having both high catalytic performance and high proton conductive properties. Non-patent document 1 has reported that the carbon-based solid acid has high performance as a catalyst for hydrolyzing cellulose. Patent document 4 has reported a carbon-based solid acid which has high ion-exchange capacity, high catalytic performance, high proton conductive properties, and excellent heat resistance so that it can be used in a proton conductive membrane, a solid acid catalyst, an ion-exchange membrane, a membrane electrode assembly, and a fuel cell. Patent document 6 has reported a catalyst precursor using a carbon-based solid acid, a catalyst material, and a method for producing a catalyst.

With respect to the report on the method for synthesizing or producing the carbon-based solid acid and raw materials of the carbon-based solid acid, for example, non-patent document 1 has reported a method for producing a carbon-based solid acid using crystalline cellulose as a main raw material and using 30% fuming sulfuric acid and concentrated sulfuric acid as a sulfonating agent. Patent documents 1 to 4 and 6 have reported a method for producing a carbon-based solid acid using an aromatic hydrocarbon and others as a main raw material and using fuming sulfuric acid and concentrated sulfuric acid as a sulfonating agent. Further, patent document 5 has reported a method for industrially producing a carbon-based solid acid using as a main raw material a carbon source, such as pure cellulose, a cellulose-containing raw material, trees, plants, fruits, seeds, or regenerated cellulose, and using sulfur trioxide as a sulfonating agent. Patent document 7 has reported a method for producing a carbon-based solid acid using a naphthalene carbon source as a main raw material and using concentrated sulfuric acid as a sulfonating agent.

Meanwhile, non-patent document 2 has reported that, when a fluorine electrolyte, such as Nafion (registered trademark; manufactured by DuPont Inc.), is introduced into a catalyst layer for a polymer electrolyte fuel cell as an electrolyte, the amount of the catalyst used can be drastically reduced. For introducing an electrolyte into the catalyst layer, a method is employed in which a catalyst ink is first prepared, and, with respect to the composition of the catalyst ink, the catalyst ink comprises a catalyst component, a catalyst carrier for having supported the catalyst component, an electrolyte, and a solvent, and a catalyst layer for a polymer electrolyte fuel cell is generally formed on the basis of the catalyst ink process at present.

PRIOR ART REFERENCES

Non-patent Documents

Non-patent document 1: "Shokubai Chousei Handobukku (How to Prepare Heterogeneous and Homogeneous Catalysts)", edited under the supervision of Masakazu Iwamoto, NTS Inc. (Tokyo), 2011, pages 634-635

Non-patent document 2: Journal of The Electrochemical Society 2002, vol. 149(7), S59-S67

Patent Documents

Patent document 1: International Patent Publication No. 2005/029508
Patent document 2: Japanese Patent No. 4041409
Patent document 3: Japanese Patent No. 4582546
Patent document 4: Japanese Patent No. 4925399
Patent document 5: Japanese Patent No. 5528036
Patent document 6: Japanese Patent No. 5182987
Patent document 7: Japanese Patent No. 5017902

SUMMARY OF THE INVENTION

Problems to be Solved by the Invention

As reported in patent documents 3 and 4, the carbon-based solid acid has a sulfonic acid group which is a strong acid group, and therefore is expected to be a material which has such high ion-exchange capacity, catalytic performance and proton conductive properties and excellent heat resistance that it is usable in a fuel cell. However, patent documents 3 and 4 have a report that the carbon-based solid acid can be used as an electrolyte for a proton conductive membrane of a fuel cell, but have no description about the use of the carbon-based solid acid in a catalyst layer for a fuel cell. Further, these patent documents do not have a report that a fuel cell was actually produced and found to be operated.

Patent document 6 has a description of a catalyst precursor using a carbon-based solid acid, a catalyst material, and a method for producing a catalyst, but does not have a report that a fuel cell was actually produced and found to be operated.

In patent document 7, there is a report that a carbon-based solid acid is used in a catalyst layer for a polymer electrolyte fuel cell, and Nafion (registered trademark; manufactured by DuPont Inc.) which is an electrolyte and a carbon-based solid acid are used in combination in a catalyst layer for a polymer electrolyte fuel cell, and the resultant fuel cell generates electricity.

In view of the above, the present invention has been made, and an object of the present invention is to provide a material which can be used in a catalyst layer for a fuel cell and exhibits excellent proton conductive properties.

Means for Solving the Problems

The present inventors have conducted extensive and intensive studies. As a result, it has been found that, by conducting a synthesis reaction in which a substituent having a sulfonic acid group at an end (sulfonic acid group through a linker) is introduced into a conventional carbon-based solid acid, a carbon-based solid acid having sulfonic acid groups (including a sulfonic acid group as an end group of a substituent) in a larger amount than that of the conventional carbon-based solid acid is obtained, and the obtained carbon-based solid acid improves the proton conductive properties, achieving excellent electricity generation properties.

Further, it has been found that, when the carbon-based solid acid of the present invention is used in a catalyst ink for forming a catalyst layer for a fuel cell, the catalyst ink can be applied without suffering aggregation, and the frequency of clogging of a nozzle of the ink application apparatus can be reduced.

Thus, in the case where the carbon-based solid acid of the present invention is used in a catalyst layer for a fuel cell, it has been found that, even when the carbon-based solid acid of the present invention is solely used, that is, an electrolyte of a catalyst layer, for example, a perfluorosulfonic acid polymer, such as Nafion (registered trademark; manufactured by DuPont Inc.), or a hydrocarbon polymer having a sulfonic group introduced into the polymer is not used in combination with the carbon-based solid acid of the present invention, electricity generation properties and excellent ink application properties can be obtained, and the present invention has been completed.

The present invention has been made, based on the above novel finding, and is as follows.

[1] A carbon-based solid acid comprising a carbon material having a sulfonic acid group through a linker.

[2] The carbon-based solid acid according to item [1] above, wherein the linker is an oxyalkylene chain.

[3] The carbon-based solid acid according to item [1] or [2] above, wherein the carbon material has a graphene structure in at least part thereof.

[4] The carbon-based solid acid according to any one of items [1] to [3] above, wherein the carbon material further has at least one member selected from the group consisting of a hydrogen atom, a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure.

[5] The carbon-based solid acid according to any one of items [1] to [4] above, which has a structure represented by the following formula (1):

[Chemical formula 1]

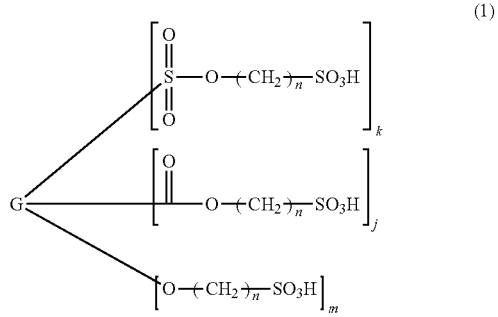

wherein G represents graphene optionally having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure, k represents an integer of 0 or 1 or more, j represents an integer of 0 or 1 or more, and m represents an integer of 0 or 1 or more, wherein at least one of k, j, and m represents an integer of 1 or more, and n represents an integer of 2 to 4.

[6] The carbon-based solid acid according to any one of items [2] to [5] above, wherein, in the sulfonic acid group through the oxyalkylene chain, oxygen of the oxyalkylene chain is directly bonded to the carbon material, and carbon of the alkylene chain at the end on the side opposite to the oxygen is directly bonded to the sulfonic acid group.

[7] The carbon-based solid acid according to item [5] above, which has the structure of the formula (1) wherein k=0, j=0, and m is an integer of 1 or more.

[8] A catalyst layer for a fuel cell, containing the carbon-based solid acid according to any one of items [1] to [7] above.

[9] The catalyst layer for a fuel cell according to item [8] above, wherein the carbon-based solid acid is a kind of electrolyte and a kind of catalyst carrier.

[10] The catalyst layer for a fuel cell according to item [8] or [9] above, which further contains a perfluorosulfonic acid polymer.

[11] The catalyst layer for a fuel cell according to any one of items [8] to [10] above, which further contains a binder.

[12] A method for producing a carbon-based solid acid, comprising the step of reacting a carbon material having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure, and a sultone with each other.

[13] The method for producing a carbon-based solid acid according to item [12] above, wherein the sultone is at least one member selected from the group consisting of 1,3-propane sultone, 2,4-butane sultone, 1,4-butane sultone, 1,3-butane sultone, and 2,4-pentane sultone.

[14] The method for producing a carbon-based solid acid according to item [12] or [13] above, wherein the carbon material has a graphene structure in at least part thereof.

[15] A composition containing the carbon-based solid acid according to any one of items [1] to [7] above and a perfluorosulfonic acid polymer.

[16] A method for producing a carbon-based solid acid having a catalyst supported, comprising subjecting a catalyst layer forming composition containing the carbon-based solid acid according to any one of items [1] to [7] above and a catalyst to disintegration treatment.

[17] The method for producing a carbon-based solid acid having a catalyst supported according to item [16] above, which comprises subjecting a catalyst layer forming composition containing the carbon-based solid acid according to any one of items [1] to [7] above and a catalyst carrier having a catalyst supported thereon to disintegration treatment.

[18] A catalyst layer for a fuel cell, containing a carbon-based solid acid comprising a carbon material having a sulfonic acid group, and a catalyst, wherein the carbon-based solid acid has the catalyst supported.

[19] A method for producing a carbon-based solid acid having a catalyst supported, comprising subjecting a catalyst layer forming composition containing a carbon-based solid acid comprising a carbon material having a sulfonic acid group and a catalyst to disintegration treatment.

Effects of the Invention

The carbon-based solid acid of the present invention has excellent proton conductive properties, and therefore can be used in a catalyst layer for a fuel cell.

Further, when the carbon-based solid acid of the present invention is used in a catalyst ink used for forming a catalyst layer for a fuel cell, the frequency of clogging of a nozzle of the ink application apparatus, which occurs when the catalyst ink is applied, can be reduced, and therefore it is expected that the efficiency of the mass-production of fuel cell is improved and the quality of the produced fuel cell is stabilized.

MODE FOR CARRYING OUT THE INVENTION

First Embodiment of the Present Invention

Figure 1:
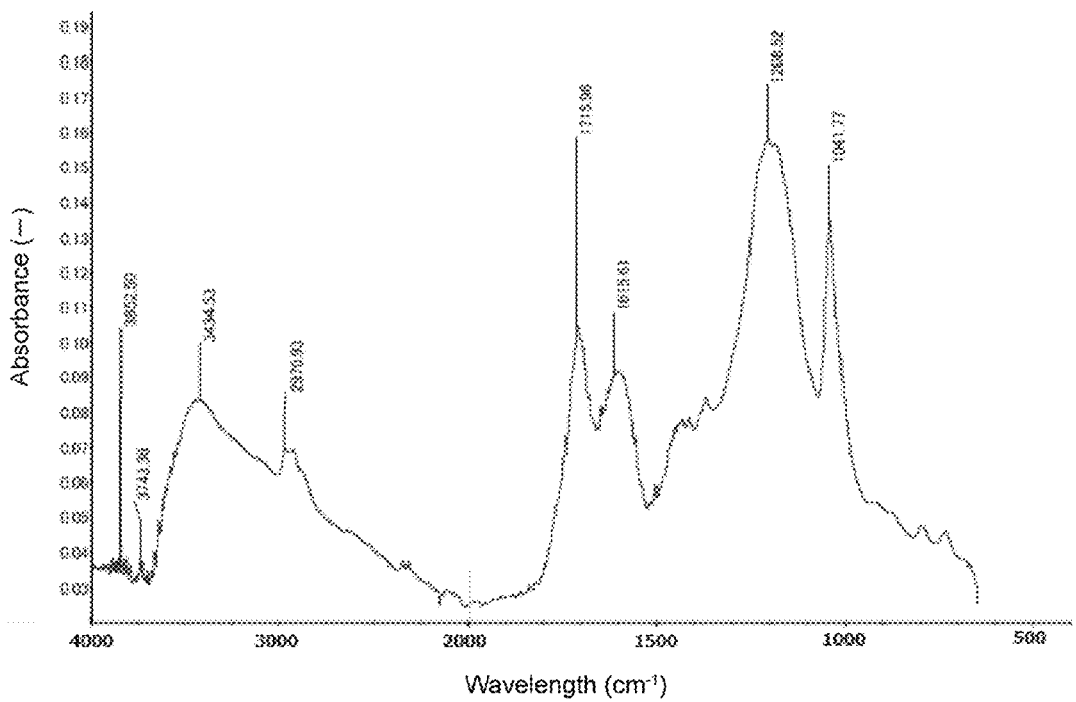
FIG. 1 An IR chart of carbon-based solid acid (1) obtained in Example 1.

The first embodiment of the present invention is directed to a carbon-based solid acid comprising a carbon material having a sulfonic acid group through a linker (hereinafter, frequently referred to as "the carbon-based solid acid").

<Carbon-Based Solid Acid Comprising a Carbon Material Having a Sulfonic Acid Group through a Linker>

The carbon material in the carbon-based solid acid means a material produced through carbonization by subjecting an organic compound to heat treatment. Examples of organic compounds as a carbon source include petroleum pitch, coal pitch, a phenolic resin, a polyvinyl alcohol resin, a cellulose resin, a polystyrene resin, a polyimide resin, an epoxy resin, crystalline cellulose, pure cellulose, trees, plants, fruits, seeds, regenerated cellulose, and an aromatic hydrocarbon, and preferred are crystalline cellulose, pure cellulose, trees, plants, fruits, seeds, regenerated cellulose, and an aromatic hydrocarbon.

It is preferred that the carbon material in the carbon-based solid acid has a graphene structure in at least part thereof. As an example of the carbon material having a graphene structure in at least part thereof, there can be mentioned a graphene sheet. With respect to the size of the graphene sheet, there is no particular limitation, but the graphene sheet preferably has a maximum length in the planner direction of 1,000 nm or less, preferably 500 nm or less, more preferably 200 nm or less.

The carbon material in the carbon-based solid acid preferably has, in addition to the sulfonic acid group through a linker, as a substituent on the surface and carbon deficient portion of the carbon material, for example, a sulfonic acid group, a hydroxyl group, a carboxyl group, a carbonyl group, a formyl group, or an oxysulfonic acid group, more preferably has a hydroxyl group, and preferably has, as a structure of the surface and carbon deficient portion of the carbon material, for example, a carboxylic acid anhydride structure, a chromene structure, a lactone structure, an ester structure, or an ether structure, more preferably has an ether structure. With respect to these functional groups and structures, the type and the amount present in the carbon material vary depending on the conditions for carbonization for conversion to a carbonaceous material by heat treatment and the carbon source of the raw materials. In the present specification, the carbon material and graphene do not have all the hydrogen atoms replaced by the above-mentioned functional group or structure, and have at least a hydrogen atom.

For example, "Shokubai Chousei Handobukku (How to Prepare Heterogeneous and Homogeneous Catalysts)" (NTS Inc. (Tokyo), 2011, pages 634-635), which is a non-patent document, has reported that a carbon-based solid acid has a hydroxyl group, a carboxyl group, or a sulfonic acid group as a substituent on the surface and carbon deficient portion of the carbon-based solid acid.

The sulfonic acid group through a linker in the carbon material is present as a substituent on the surface and carbon deficient portion of the carbon material.

In the sulfonic acid group through a linker, the linker is preferably an oxyalkylene chain.

With respect to the alkylene chain in the oxyalkylene chain, there is no particular limitation, but preferred are a linear alkylene chain having 2 to 4 carbon atoms and a branched alkylene chain having 4 carbon atoms, more preferred are a linear alkylene chain having 3 carbon atoms or having 4 carbon atoms and a branched alkylene chain having 4 carbon atoms, and further preferred is a linear alkylene chain having 3 carbon atoms.

The sulfonic acid group may be bonded to the carbon material further through a carbonyl group or a sulfonyl group as well as the oxyalkylene chain.

It is preferred that the carbon-based solid acid has a structure represented by the following formula (1).

[Chemical formula 2]

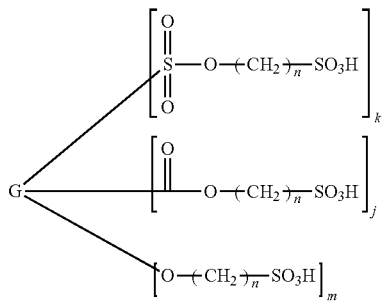

(1)

In the formula (1), G represents graphene optionally having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure. G is preferably graphene having at least one member selected from the group consisting of a hydroxyl group, a carboxyl group, and a sulfonic acid group.

k represents an integer of 0 or 1 or more, j represents an integer of 0 or 1 or more, and m represents an integer of 0 or 1 or more, wherein at least one of k, j, and m represents an integer of 1 or more.

k is preferably an integer of 1 to 5, further preferably an integer of 1 to 3.

j is preferably an integer of 1 to 3, further preferably an integer of 1 or 2.

m is preferably an integer of 1 to 10, further preferably an integer of 1 to 6.

n represents an integer of 2 to 4, and is preferably 3 or 4, more preferably 3.

With respect to the compound represented by the formula (1) above, there is no particular limitation, but, for example, there can be mentioned a compound represented by the formula (1b) or (1c) below. In the formulae (1b) and (1c), the size of the graphene structure is arbitrary, and the number of each substituent and the position of the graphene structure to which each substituent is bonded are arbitrary.

[Chemical formula 3]

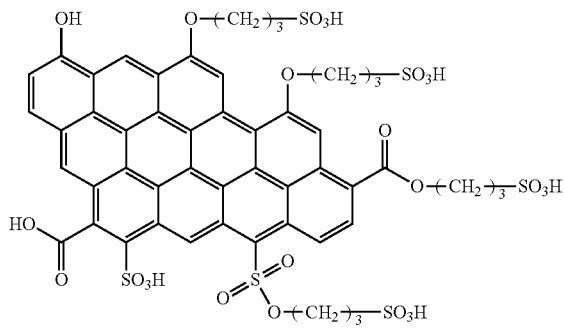

(1b)

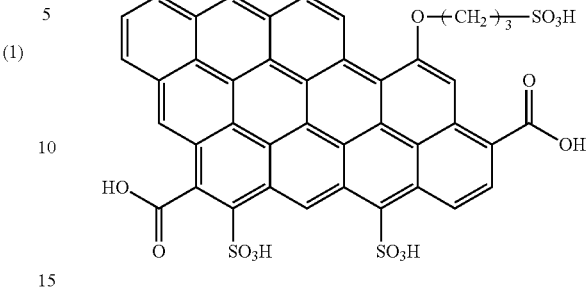

(1c)

Further, it is preferred that the carbon material in the carbon-based solid acid has the sulfonic acid group through the oxyalkylene chain wherein oxygen of the oxyalkylene chain is directly bonded to the carbon material, and carbon of the alkylene chain at the end on the side opposite to the oxygen is directly bonded to the sulfonic acid group, i.e., sulfonic acid group through only the oxyalkylene chain.

Specifically, the carbon-based solid acid further preferably has the structure of the formula (1) wherein k=0, j=0, and m is an integer of 1 or more, i.e., structure represented by the following formula (2).

[Chemical formula 4]

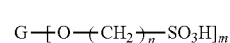

(2)

In the formula (2), G and n are as defined for the formula (1).

m is preferably an integer of 1 to 10, further preferably an integer of 1 to 6.

As examples of the partial structure having a sulfonic acid group of the carbon-based solid acid represented by the formula (1) above, there can be mentioned a sulfonic acid group through an oxyalkylene chain, which has a bonding to the carbon material on the oxygen side of the oxyalkylene chain and has a sulfonic acid group on the alkylene end carbon side of the oxyalkylene chain; a sulfonic acid group through a carbonyl group and an oxyalkylene chain, which is bonded to the carbon material through a carbonyl group on the oxygen side of the oxyalkylene chain and has a sulfonic acid group on the alkylene end carbon side of the oxyalkylene chain; a sulfonic acid group through a sulfonyl group and an oxyalkylene chain, which is bonded to the carbon material through a sulfonyl group on the oxygen side of the oxyalkylene chain and has a sulfonic acid group on the alkylene end carbon side of the oxyalkylene chain; a sulfonic acid group; and an oxysulfonic acid group. However, in the carbon-based solid acid having an ester structure in the partial structure, a hydrolysis reaction proceeds under conditions for the operation of a fuel cell, and therefore, from the viewpoint of the stability of the catalyst layer, the carbon-based solid acid represented by the formula (1) is preferably represented by the formula (2), and further, with respect to the partial structure having a sulfonic acid group, the carbon-based solid acid preferably has a sulfonic acid group through only an oxyalkylene chain, which has a bonding to the carbon material on the oxygen side and has a sulfonic acid group on the alkylene end carbon side, or has only a sulfonic acid group.

<Fuel Cell>

Figure 7:
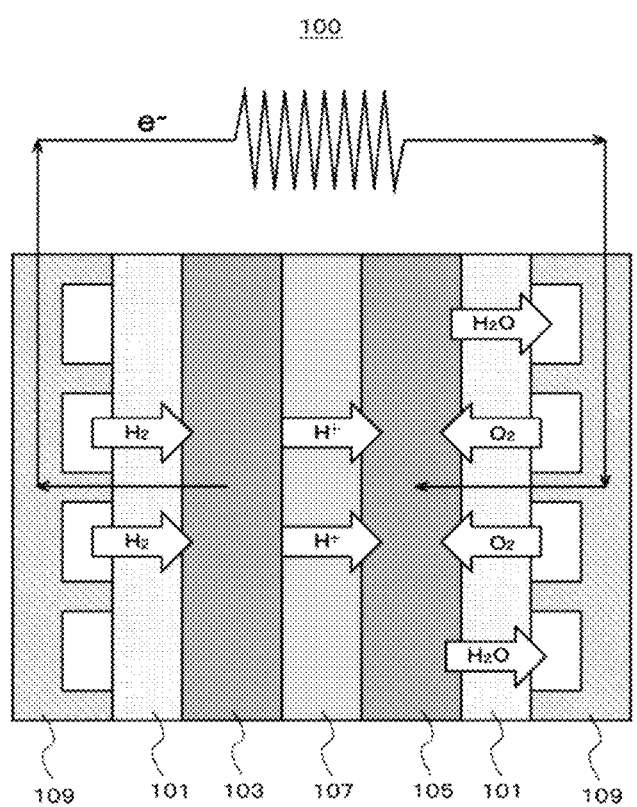
FIG. 7 A cross-sectional view diagrammatically showing the construction of a polymer electrolyte fuel cell.

FIG. 7 is a cross-sectional view diagrammatically showing the construction of a polymer electrolyte fuel cell. Polymer electrolyte fuel cell 100 has anode catalyst layer 103, cathode catalyst layer 105, and solid electrolyte membrane 107 disposed between the catalyst layers, and each catalyst layer has gas diffusion layer (hereinafter, abbreviated to "GDL") 101 as an outside layer. This construction is called a membrane electrode assembly (hereinafter, abbreviated to "MEA"). A fuel cell generally has the MEA disposed between separators 109.

At least one of anode catalyst layer 103 and cathode catalyst layer 105 contains the carbon-based solid acid. Further, solid electrolyte membrane 107 also may contain the carbon-based solid acid. From the viewpoint of the suppression of overvoltage increase during the high current driving, it is preferred that the carbon-based solid acid is used in at least cathode catalyst layer 105.

The carbon-based solid acid has proton conductive properties and oxygen permeability, and further has a function to have supported thereon a catalyst by virtue of the structure thereof. Therefore, the carbon-based solid acid can be used in a catalyst layer for a fuel cell as a catalyst carrier, an electrolyte, or both of them, and as an electrolyte in a solid electrolyte membrane.

With respect to the main function of the carbon-based solid acid, it is considered that the portion having a sulfonic acid group has a function of proton conduction as a solid electrolyte, and, when the carbon-based solid acid has a graphene structure, the portion having a graphene structure has a function of electronic conduction, and the solid surface of the carbon-based solid acid has a function to have supported thereon a catalyst required for the reaction of a fuel cell, and further the pores of the carbon material itself have a function of diffusion of fuel gas and adsorption and desorption of water.

Each of anode catalyst layer 103 and cathode catalyst layer 105 contains, in addition to the carbon-based solid acid, a catalyst component, a catalyst carrier for having supported the catalyst component, and an electrolyte, of each layer. Alternatively, the catalyst carrier and electrolyte may be the carbon-based solid acid.

It is preferred that the carbon-based solid acid is a kind of electrolyte and a kind of catalyst carrier. When the carbon-based solid acid serves as both an electrolyte and a catalyst carrier, the catalyst carrier that conventionally has not have proton conductive properties has proton conductive properties, and is expected to improve the electric properties of a fuel cell.

The catalyst supported on a catalyst carrier is referred to as electrocatalyst. In the present specification, anode catalyst layer 103 and cathode catalyst layer 105 are frequently referred to simply as "catalyst layer".

With respect to the catalyst component in anode catalyst layer 103, there is no particular limitation and a known catalyst can be used, and, with respect to the catalyst component in cathode catalyst layer 105, there is no particular limitation and a known catalyst can be used. Examples of the catalyst components used in anode catalyst layer 103 and cathode catalyst layer 105 include metals, such as platinum, gold, silver, ruthenium, iridium, rhodium, palladium, osmium, tungsten, lead, iron, chromium, cobalt, nickel, manganese, vanadium, molybdenum, gallium, and aluminum, and alloys thereof. A main function of the catalyst component is to cause an electrochemical reaction.

Examples of catalyst carriers in the catalyst layer include the carbon-based solid acid, carbon black, such as channel black, furnace black, and thermal black, and carbon materials, such as activated carbon obtained by subjecting various materials containing a carbon atom to carbonization for activation treatment, coke, natural graphite, artificial graphite, and graphitized carbon. Of these, as the catalyst carrier, preferred are the carbon-based solid acid and carbon black because they have high specific surface area and excellent electronic conductive properties. A main function of the catalyst carrier is to conduct electrons. Further examples of main functions of the catalyst carrier include transport of fuel gas and water by virtue of pores of the catalyst carrier.

For suppressing lowering of the electronic conductive properties in the electrocatalyst, a binder for binding the catalyst carrier together can be used in the catalyst layer, and examples of binders include fluorine sulfonic acid polymers, such as polytetrafluoroethylene (PTFE), polyvinylidene fluoride (PVDF), an ethylene-propylene-diene copolymer (EPDM), Nafion (registered trademark; manufactured by DuPont Inc.), Aquivion (registered trademark; manufactured by Solvay S. A.), Flemion (registered trademark; manufactured by AGC Inc.), and Aciplex (registered trademark; manufactured by Asahi Kasei Corporation).

Examples of electrolytes in the catalyst layer include the carbon-based solid acid, fluorine sulfonic acid polymers, such as Nafion (registered trademark; manufactured by DuPont Inc.), Aquivion (registered trademark; manufactured by Solvay S. A.), Flemion (registered trademark; manufactured by AGC Inc.), and Aciplex (registered trademark; manufactured by Asahi Kasei Corporation), hydrocarbon sulfonic acid polymers, and fluorine sulfonic acid polymer partially introduced-type hydrocarbon sulfonic acid polymers. With respect to the electrolyte, preferred are the carbon-based solid acid and perfluorosulfonic acid polymers, such as Nafion (registered trademark; manufactured by DuPont Inc.), Aquivion (registered trademark; manufactured by Solvay S. A.), Flemion (registered trademark; manufactured by AGC Inc.), and Aciplex (registered trademark; manufactured by Asahi Kasei Corporation), and more preferred are the carbon-based solid acid and Nafion (registered trademark; manufactured by DuPont Inc.). The carbon-based solid acid can be solely used, or the carbon-based solid acid and the above-mentioned electrolyte can be used in combination. A main function of the electrolyte in the catalyst layer is to conduct protons, but, from the viewpoint of being further required to pass fuel gas and transport water simultaneously with the proton conduction, and from the viewpoint of the voltage properties in a high current region, the electrolyte in the catalyst layer of the present invention preferably contains the carbon-based solid acid and a perfluorosulfonic acid polymer, such as the above-mentioned Nafion.

The method for forming catalyst layer 103 and catalyst layer 105 is described. A catalyst component, a catalyst carrier, and an electrolyte are dispersed in a solvent to prepare a composition as a catalyst ink, and then the catalyst ink is applied onto an intended substrate and dried to form a catalyst layer. Examples of intended substrates include a solid electrolyte membrane, a GDL, and a sheet formed from a fluororesin, and a catalyst layer can be formed by a known method, such as a decal (decalcomania) process. When the catalyst ink is applied to a sheet formed from a fluororesin, the applied catalyst layer is transferred to a solid electrolyte. The sheet formed from a fluororesin is generally a sheet formed from polytetrafluoroethylene (PTFE).

With respect to the composition of the catalyst ink, generally, the catalyst ink comprises the above-mentioned catalyst component, the above-mentioned catalyst carrier for having supported the catalyst component, the above-mentioned electrolyte and solvent. Further, in the composition of the catalyst ink, a binder for binding the catalyst carrier together can be incorporated into the catalyst ink. Controlling the composition of the catalyst ink enables an improvement of the function or performance, e.g., suppression of lowering of the electronic conductive properties, improvement of the proton conductive properties, improvement of the diffusion properties for fuel gas, improvement of the efficiency of water transport, and improvement of the mechanical strength of the catalyst layer.

Examples of solvents used in the catalyst ink include water, methanol, ethanol, 1-propanol, 2-propanol, 1-butanol, 2-butanol, isobutyl alcohol, tert-butyl alcohol, pentanol, dimethyl sulfoxide, and N,N-dimethylformamide. As the solvent, preferred are water, methanol, ethanol, 1-propanol, 2-propanol, 1-butanol, 2-butanol, and isobutyl alcohol. Two or more of the above-mentioned solvents can be used in combination. From the viewpoint of suppressing reaggregation of the ink to facilitate application of the ink and further preventing the solvent from remaining in the catalyst layer, as the solvent used in the catalyst ink, water, ethanol, and 1-propanol are more preferred.

Examples of the compositions of the catalyst ink include a composition of the catalyst ink in which the catalyst is platinum, the catalyst carrier is carbon black, and the electrolyte is the carbon-based solid acid and Nafion (registered trademark; manufactured by DuPont Inc.), and a composition of the catalyst ink in which the catalyst is platinum, the catalyst carrier is carbon black, and the electrolyte is the carbon-based solid acid. Further examples include a composition of the catalyst ink in which the catalyst is platinum, the catalyst carrier is carbon black and the carbon-based solid acid or only the carbon-based solid acid, and the electrolyte is the carbon-based solid acid. A catalyst ink having the carbon-based solid acid as at least part of a catalyst carrier is produced by subjecting a catalyst layer forming composition containing the carbon-based solid acid and a catalyst to disintegration treatment, and thus a catalyst ink containing the carbon-based solid acid having a catalyst supported is obtained.

Examples of the disintegration treatments include a dry disintegration treatment and a wet disintegration treatment. Examples of means for a dry disintegration treatment include a ball mill, a planetary mill, a pin mill, and a jet mill. Examples of means for a wet disintegration treatment include an ultrasonic homogenizer, an ultrasonic dispersion mixer, a bead mill, a sand grinder, a homogenizer, and a wet jet mill. Of these, preferred means for the disintegration treatment are a ball mill, an ultrasonic homogenizer, an ultrasonic dispersion mixer, and a homogenizer, and an ultrasonic homogenizer is especially preferred. With respect to the solvent used in the wet disintegration treatment, there is no particular limitation, but, for example, the solvent used in the catalyst ink can be used.

Figure 8:
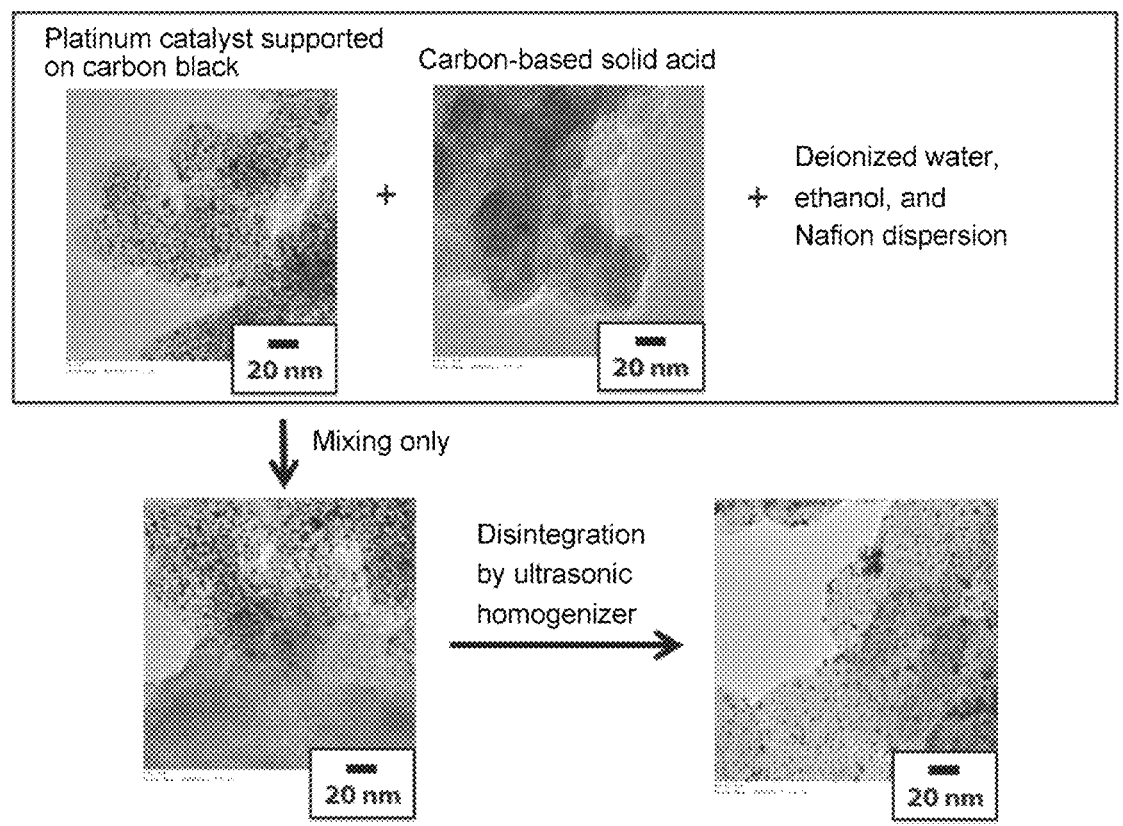
FIG. 8 TEM photomicrographs of the carbon-based solid acid having a catalyst supported, which is obtained by disintegrating a catalyst layer forming composition using an ultrasonic homogenizer.

More specifically, when a composition containing a platinum catalyst supported on carbon black (manufactured by Tanaka Kikinzoku Kogyo K. K.; platinum content: 46.5% by weight; trade name: "TEC10E50E"), the carbon-based solid acid, deionized water, ethanol (manufactured by Wako Pure Chemical Industries, Ltd.), and a Nafion dispersion (manufactured by Wako Pure Chemical Industries, Ltd.; trade name: "5% Nafion Dispersion Solution DE521 CS type") is disintegrated using an ultrasonic homogenizer, at least part of the platinum is moved from the carbon black to the carbon-based solid acid, obtaining a catalyst ink containing the carbon-based solid acid having a catalyst supported. The process of the preparation of a catalyst ink is shown in FIG. 8.

A membrane electrode assembly (MEA) is formed using the carbon-based solid acid when preparing the catalyst ink, and incorporated into a unit cell, making it possible to obtain electricity generation properties.

Further, by using the carbon-based solid acid in the catalyst ink, the frequency of clogging of a nozzle of the ink application apparatus, which frequently occurs when the catalyst ink is applied, can be drastically reduced, and therefore it is expected that the efficiency of the mass-production of fuel cell is improved and the quality of the produced fuel cell is stabilized.

A ratio of the amount of the carbon-based solid acid used in the catalyst layer is determined by making a calculation using the formula below. In the calculation formula below, with respect to the weight of each of the electrocatalyst, carbon-based solid acid, electrolyte, and binder, a weight of the solids remaining after removing the water and solvent was used in the calculation. Further, in the calculation formula below, the electrolyte and electrocatalyst do not contain the carbon-based solid acid of the present invention.

Carbon-based solid acid ratio (% by weight)=[Carbon-based solid acid (weight)/{Total weight of catalyst layer (in terms of the weight of the solids contained in the catalyst layer)}]×100 (% by weight)=[Carbon-based solid acid (weight)/{Electrocatalyst (weight)+Electrolyte (weight)+Binder (weight)+Carbon-based solid acid (weight)}]×100 (% by weight)

The carbon-based solid acid ratio is preferably 1 to 95%, more preferably 15 to 45%.

Examples of materials for solid electrolyte membrane 107 include the above-mentioned carbon-based solid acid, fluorine sulfonic acid polymers, such as Nafion (registered trademark; manufactured by DuPont Inc.), Aquivion (registered trademark; manufactured by Solvay S. A.), Flemion (registered trademark; manufactured by AGC Inc.), and Aciplex (registered trademark; manufactured by Asahi Kasei Corporation), hydrocarbon sulfonic acid polymers, and fluorine sulfonic acid polymer partially introduced-type hydrocarbon sulfonic acid polymers. In the catalyst layer containing the carbon-based solid acid, with respect to the material for the solid electrolyte membrane, any material of a fluorine sulfonic acid polymer, a hydrocarbon sulfonic acid polymer, and a fluorine sulfonic acid polymer partially introduced-type hydrocarbon sulfonic acid polymer can be used as a material for the catalyst layer, and a fluorine sulfonic acid polymer and a fluorine sulfonic acid polymer partially introduced-type hydrocarbon sulfonic acid polymer are preferably used.

With respect to gas diffusion layer 101, there is no particular limitation, but a porous material having electrical conductivity is preferably used, and examples of such materials include paper and nonwoven fabric each made of carbon, felt, and nonwoven fabric. Further, the GDL includes a material coated with a layer called a microporous layer (hereinafter, abbreviated to "MPL") which is a coating layer comprised mainly of a water-repellent resin and a carbon material, and such a layer has been reported to achieve effective transport of water during electricity generation of a fuel cell, and a gas diffusion layer having the MPL can be used in the catalyst layer containing the carbon-based solid acid. In the electricity generation test in the present invention, water-repellent carbon paper which is a GDL having no MPL was used.

<Composition containing the Carbon-Based Solid Acid>

A composition containing the carbon-based solid acid preferably contains a perfluorosulfonic acid polymer from the viewpoint of the voltage properties in a high current region in the case where the composition is used in a catalyst layer for a fuel cell. The composition can contain, for example, the below-mentioned electrolyte and catalyst carrier.

Examples of perfluorosulfonic acid polymers include fluorine sulfonic acid polymers, such as Nafion (registered trademark; manufactured by DuPont Inc.), Aquivion (registered trademark; manufactured by Solvay S. A.), Flemion (registered trademark; manufactured by AGC Inc.), and Aciplex (registered trademark; manufactured by Asahi Kasei Corporation).

<Method for Producing a Carbon-Based Solid Acid comprising a Carbon Material having a Sulfonic Acid Group though a Linker>

A carbon-based solid acid comprising a carbon material having a sulfonic acid group through a linker can be produced by step 1. From the viewpoint of the durability, it is preferred that step 2 is performed after step 1.

[Step 1] The carbon material which is a starting material used in the synthesis of the carbon-based solid acid of the present invention is available from, for example, Fuji Pigment Co., Ltd., and Futamura Chemical Co., Ltd. Further, the carbon-based solid acid synthesized by the method described in International Patent Publication No. 2005/029508 and Japanese Patent Nos. 4041409, 4925399, and 5528036, which are patent documents, may be used as a starting material.

In step 1, a carbon material having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure, and a sultone, which are starting materials, are reacted with each other.

By step 1, a carbon-based solid acid comprising a carbon material having a sulfonic acid group through a linker wherein the linker is an oxyalkylene chain can be obtained.

It is preferred that the carbon material used in the reaction of step 1 has a graphene structure in at least part thereof.

It is preferred that the carbon material used in the reaction of step 1 has at least one member selected from the group consisting of a hydroxyl group, a sulfonic acid group, and an ether structure.

Examples of the sultones used in step 1 include 1,3-propane sultone, 2,4-butane sultone, 1,4-butane sultone, 1,3-butane sultone, and 2,4-pentane sultone, and preferred are 1,3-propane sultone and 2,4-butane sultone.

Step 1 can be conducted in the presence of, for example, sodium hydride, lithium hydride, sodium hydroxide, 1,8-diazabicyclo-5,4,0-undec-7-ene (DBU), trimethylamine, triethylamine, tripropylamine, N-ethylmethylbutylamine, tributylamine, N,N-dimethylbenzylamine, N,N-diethylbenzylamine, or tribenzylamine. Of these, sodium hydride and lithium hydride are preferred from the viewpoint of removing water in the reaction mixture in order to prevent the sultone compound from suffering ring-opening by a hydrolysis reaction due to water.

With respect to the solvent used in step 1, any non-aqueous solvent capable of dispersing the carbon-based solid acid therein can be used, and examples of such solvents include cyclohexane, benzene, toluene, nitrobenzene, carbon tetrachloride, diethyl ether, tetrahydrofuran, isooxazole, 1,4-dioxane, cyclopentyl methyl ether, acetone, acetonitrile, nitromethane, dimethyl sulfoxide, N,N-dimethylformamide, sulfolane, 1,3-propane sultone, and 1,4-butane sultone. 1,3-Propane sultone is an object to be reacted, but can serve also as a solvent. Preferred are toluene, tetrahydrofuran, dimethyl sulfoxide, N,N-dimethylformamide, and 1,3-propane sultone, and more preferred are tetrahydrofuran, dimethyl sulfoxide, N,N-dimethylformamide, and 1,3-propane sultone.

The reaction temperature in step 1 is preferably −10 to 200° C., more preferably 10 to 160° C., further preferably 15 to 140° C.

The reaction time in step 1 is preferably 1 to 500 hours, more preferably 2 to 300 hours, further preferably 5 to 150 hours.

[Step 2] In step 2, hydrolysis of the carbon-based solid acid comprising a carbon material having a sulfonic acid group through an oxyalkylene chain obtained in step 1 is conducted. Hydrolysis occurs at the ester structure portion of the substituent in the carbon material. Therefore, among the substituents having a sulfonic acid group through an oxyalkylene chain in the carbon material, the sulfonic acid group through an oxyalkylene chain bonded to the carbon material through an ester structure or a sulfonic acid ester structure is hydrolyzed at the ester structure or sulfonic acid ester structure, and the sulfonic acid group through the oxyalkylene chain is eliminated, so that a carboxylic acid group and a sulfonic group remain in the carbon material. In contrast, an ether linkage does not suffer hydrolysis even when using a strong acid, and therefore the sulfonic acid group through an oxyalkylene chain, oxygen of which is directly bonded to the carbon material, remains in the state of being bonded to the carbon material. Accordingly, the carbon-based solid acid obtained through step 2 has eliminated therefrom a substituent which possibly undergoes a hydrolysis reaction before used in a fuel cell device, and therefore can markedly reduce a possibility that decomposition products damage a fuel cell device, and thus achieves excellent durability.

Hydrolysis likely proceeds due to water contained in air, but can be conducted using, for example, an inorganic acid, such as sulfuric acid, hydrochloric acid, nitric acid, sulfurous acid, nitrous acid, or phosphoric acid, or an organic acid, such as acetic acid, lactic acid, oxalic acid, citric acid, or formic acid, and, from the viewpoint of causing the reaction to completely proceed and from the viewpoint of washing with water, hydrolysis is preferably conducted using sulfuric acid or hydrochloric acid which is a strong acid, more preferably using sulfuric acid from the viewpoint of the fuel cell device.

Step 2 may comprise a cleaning operation after the hydrolysis.

The reaction formula for step 1 and step 2 is, for example, diagrammatically shown in (Reaction formula A) below, but the structure of the carbon material is not limited to that in the formula below. In (Reaction formula A), as an example of step 1, a reaction of the carbon-based solid acid represented by, for example, the formula (1a) and a sultone which are starting materials is shown, and, as an example of step 2, hydrolysis of the carbon-based solid acid represented by, for example, the formula (1b) is shown, together with a site indicated by a dotted line, at which hydrolysis occurs.

[Chemical formula 5]

(Reaction formula A)

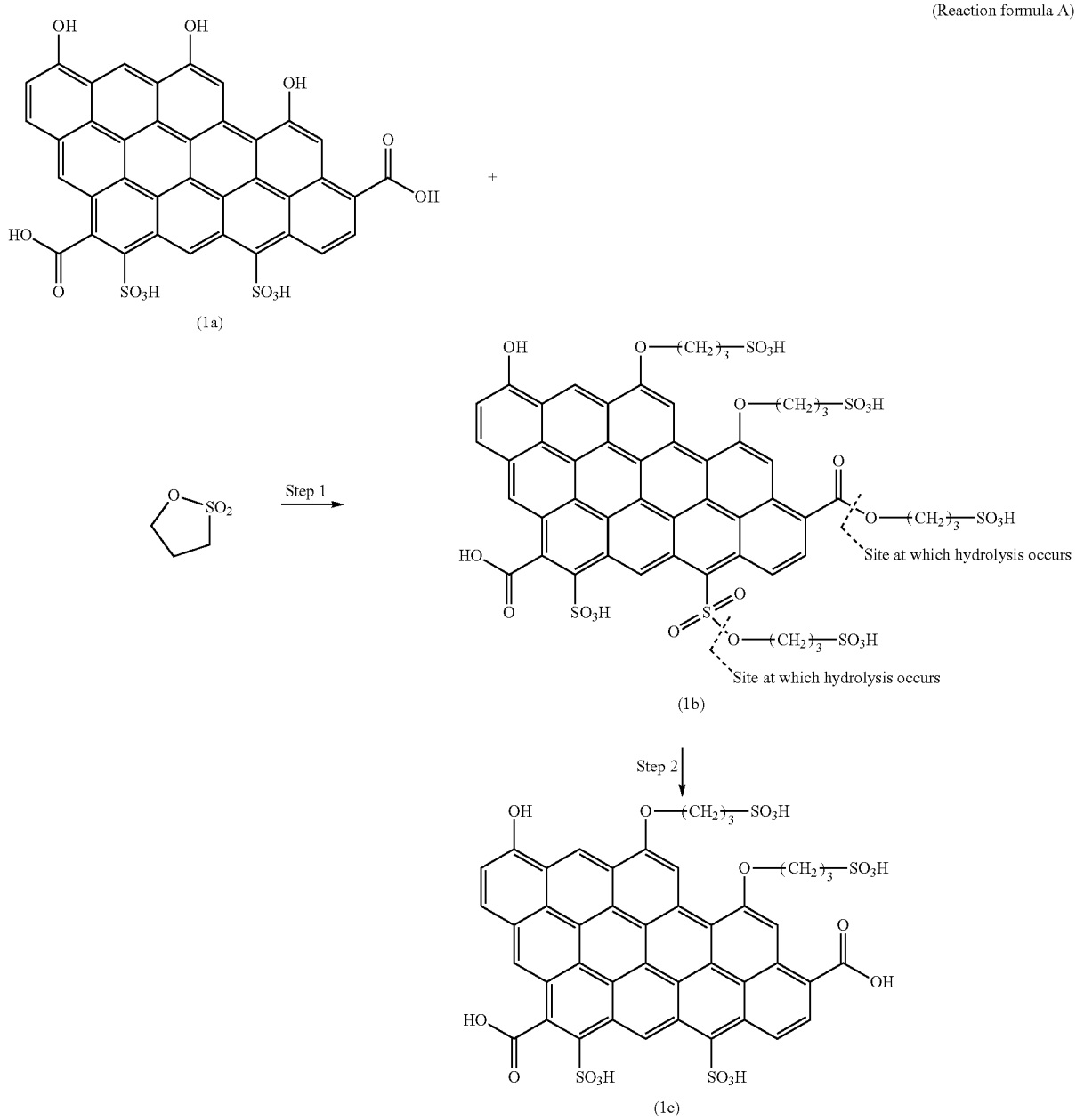

On the other hand, a conventional method is shown in (Reaction formula B) below. Step X in (Reaction formula B) is a step in which the carbon-based solid acid represented by the formula (1e) is produced from the carbon-based solid acid represented by the formula (1d) as a raw material using sulfuric acid or chlorosulfonic acid, and the carbon-based solid acid having a sulfonic acid group introduced and being represented by the formula (1e) can be produced. With respect to the carbon-based solid acid represented by the formula (1e), in the step Y, the carbon-based solid acid represented by the formula (1e) is subjected to cleaning treatment. Cleaning is performed using, for example, water as a solvent under acid conditions using, for example, sulfuric acid. When such cleaning is performed, elimination of a sulfonic acid group or hydrolysis of an oxysulfonic acid group proceeds due to a reversible reaction, and therefore it is difficult to obtain the carbon-based solid acid having excellent durability, and the sulfonic acid group on the carbon-based solid acid is reduced, leading to poor performance in a fuel cell device. Reaction formula B is also diagrammatically shown, and the structure of the carbon material is not limited to that in the formula below.

Accordingly, in contrast to the method using Reaction formula B, in the present invention, by introducing a sulfonic acid group into the carbon-based solid acid using a sultone, the carbon-based solid acid having more excellent durability can be obtained.

[Chemical formula 6]

(Reaction formula B)

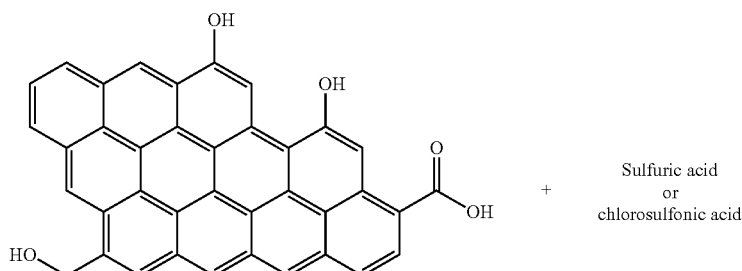

+ Sulfuric acid or chlorosulfonic acid (1d)

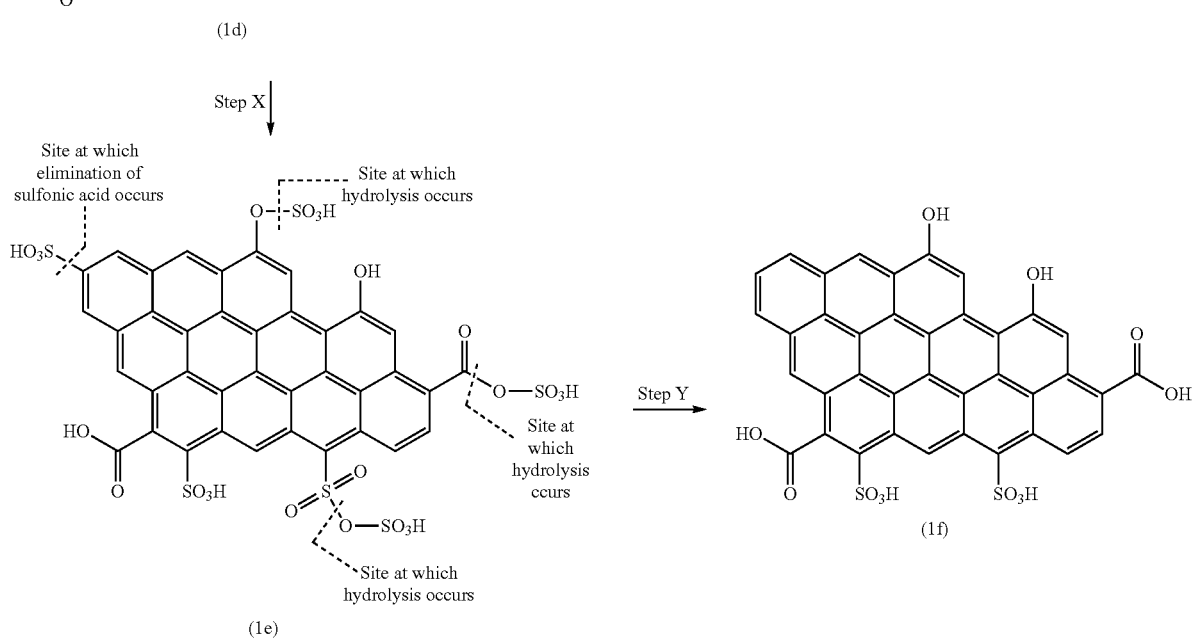

Further, in the carbon-based solid acid obtained by step 1 and step 2, it is preferred that, in the sulfonic acid group through the oxyalkylene chain, oxygen of the oxyalkylene chain is directly bonded to the carbon material, and carbon of alkylene of the oxyalkylene chain at the end on the side opposite to the oxygen is directly bonded to the sulfonic acid group, and it is further preferred that the carbon-based solid acid of the present invention has the structure of the formula (1) wherein k=0, j=0, and m is an integer of 1 or more, i.e., structure represented by the following formula (2).

[Chemical formula 7]

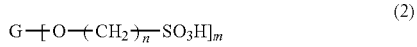

(2)

Second Embodiment of the Present Invention

The second embodiment of the present invention is directed to a catalyst layer for a fuel cell, which contains a carbon-based solid acid comprising a carbon material having a sulfonic acid group, and a catalyst, wherein the carbon-based solid acid has the catalyst supported.

As the carbon material and a preferred mode thereof, there can be mentioned ones similar to those in the first embodiment. As a preferred mode of the substituent or structure of the surface and carbon deficient portion of the carbon material, there can be mentioned ones similar to those in the first embodiment, and there can be mentioned a sulfonic acid group through a linker. The linker is similar to that in the first embodiment. As the catalyst, there can be mentioned ones similar to those in the first embodiment.

The constructions of the fuel cell and catalyst layer are similar to those in the first embodiment.

In the catalyst layer for a fuel cell, the carbon-based solid acid of the second embodiment is a kind of electrolyte and a kind of catalyst carrier. The carbon-based solid acid in the second embodiment serves as both an electrolyte and a catalyst carrier, and thus the catalyst carrier that conventionally has not have proton conductive properties has proton conductive properties, and is expected to improve the electric properties of a fuel cell.

In the second embodiment, the carbon-based solid acid comprising a carbon material having a sulfonic acid group, which serves as a catalyst carrier, has supported a catalyst. The carbon-based solid acid having a catalyst supported is produced by subjecting a catalyst layer forming composition containing a carbon-based solid acid comprising a carbon material having a sulfonic acid group and a catalyst to disintegration treatment.

Examples of the disintegration treatments include a dry disintegration treatment and a wet disintegration treatment. Examples of means for a dry disintegration treatment include a planetary mill, a pin mill, and a jet mill. Examples of means for a wet disintegration treatment include an ultrasonic homogenizer, an ultrasonic dispersion mixer, a bead mill, a sand grinder, a homogenizer, and a wet jet mill. Of these, preferred means for the disintegration treatment are an ultrasonic homogenizer, an ultrasonic dispersion mixer, and a homogenizer, and an ultrasonic homogenizer is especially preferred. With respect to the solvent used in the wet disintegration treatment, there is no particular limitation, but, for example, the solvent used in the catalyst ink for forming a catalyst layer can be used.

EXAMPLES

Hereinbelow, the present invention will be described in more detail with reference to the following Examples and Test Examples, which should not be construed as limiting the scope of the present invention. The analysis apparatuses used in the Examples and Test Examples and the conditions therefor are as described below.

Infrared Absorption (IR):

Using Fourier transform infrared spectrometer iS5, manufactured by Thermo Fisher Scientific K.K., the measurement was conducted.

Transmission Electron Microscope (TEM):

Using transmission electron microscope apparatus H-8000, manufactured by Hitachi High-Technologies Corporation, examination was made under conditions such that the accelerating voltage was 200 kV.

Electricity Generation Test A for Fuel Cell:

A membrane electrode assembly (hereinafter, abbreviated to "MEA") was formed from a solid electrolyte membrane, a gas diffusion layer (hereinafter, abbreviated to "GDL"), and a catalyst ink. As a solid electrolyte membrane, Nafion 212 membrane (registered trademark; manufactured by DuPont Inc.; purchased from Toyo Corporation; thickness: 50 μm) was used. As a GDL, carbon paper (manufactured by Toray Industries Inc.; trade name: "EC-TP1-060T") that had been processed with Teflon (registered trademark; manufactured by DuPont Inc.) which is polytetrafluoroethylene for imparting water repellency was used.

A catalyst ink was prepared using an electrocatalyst which is platinum-supported carbon (manufactured by Tanaka Kikinzoku Kogyo K. K.; platinum content: 46.5% by weight; trade name: "TEC10E50E"), deionized water, ethanol (manufactured by Wako Pure Chemical Industries, Ltd.), and the carbon-based solid acid. The electrocatalyst, carbon-based solid acid, deionized water, and ethanol were placed in a glass vial in this order, and the resultant dispersion was irradiated with ultrasonic waves at an output power set to 40% for 30 minutes using ultrasonic homogenizer Smurt NR-50M, manufactured by Microtec Co., Ltd., preparing a catalyst ink. The catalyst ink preparation conditions are described below.

Catalyst Ink Preparation Conditions:

Carbon-based solid acid ratio (% by weight) =

[Carbon-based solid acid (weight)/{Electrocatalyst (weight) +

Carbon-based solid acid (weight)}×100 (% by weight)

The catalyst ink was prepared so that the carbon-based solid acid ratio became 28% by weight. Specifically, when the weight of the electrocatalyst was 100.0 mg, the amount of the carbon-based solid acid was set to 38.9 mg, the amount of deionized water was set to 0.6 mL, and the amount of ethanol was set to 5.1 mL.

Catalyst Ink Application Conditions:

The catalyst ink was prepared and then, using spray coating apparatus V8H, manufactured by Nordson Corporation, the catalyst ink was applied to one surface of a 1 cm×1 cm square cut out from the GDL. The amount of the platinum applied was 0.3 mg per 1 $cm^2$ of one surface of the GDL. The GDL was placed on the hotplate of spray coating apparatus V8H and dried to remove deionized water and ethanol which are the solvent component of the catalyst ink, causing the catalyst ink to be fixed to the GDL. The application of the catalyst ink was performed so that the weight difference of the GDL between before and after the application became 0.896 mg as a target weight difference, and two gas diffusion electrodes (hereinafter, abbreviated to "GDE(s)") were formed.

Step of Forming an MEA:

Then, a 5 cm×5 cm square cut out from Nafion 212 membrane was set as a solid electrolyte membrane which is a middle layer, and the GDEs were individually stacked on both surfaces of the membrane so that the surface of the GDE to which the ink was applied was placed on the solid electrolyte membrane side, and then the resultant stacked material was subjected to hot press under conditions such that the upper and lower platen temperature was 132° C., the load was 0.6 kN, and the pressing time was 20 seconds to form an MEA having a three-layer structure of GDE (anode electrode)/solid electrolyte membrane/GDE (cathode electrode). The formed MEA was incorporated into a unit cell having an electrode area of 1 $cm^2$ (manufactured by FC Development Co., Ltd.; JARI standard cell), and then an electricity generation test for fuel cell was conducted.

Using a fuel cell evaluation system (AutoPEM, manufactured by Toyo Corporation), evaluation was made at a temperature of 80° C. and at a relative humidity of 95% using a hydrogen gas flow at 100 mL/minute and an air gas flow at atmospheric pressure, and a current density and a voltage were measured.

Electricity Generation Test B for Fuel Cell:

An electricity generation test was conducted by substantially the same method as in electricity generation test A for fuel cell except that the composition of the catalyst ink, the catalyst ink preparation conditions, and the catalyst ink application conditions were changed. The changed composition and conditions are described below.

A catalyst ink was prepared using an electrocatalyst which is platinum-supported carbon (manufactured by Tanaka Kikinzoku Kogyo K. K.; platinum content: 46.5% by weight; trade name: "TEC10E50E"), deionized water, ethanol (manufactured by Wako Pure Chemical Industries, Ltd.), the carbon-based solid acid, and a Nafion dispersion (manufactured by Wako Pure Chemical Industries, Ltd.; trade name: "5% Nafion Dispersion Solution DE521 CS type").

The electrocatalyst, carbon-based solid acid, deionized water, ethanol, and Nafion dispersion were placed in a glass vial in this order, and the resultant dispersion was irradiated with ultrasonic waves at an output power set to 40% for 30 minutes using ultrasonic homogenizer Smurt NR-50M, manufactured by Microtec Co., Ltd., preparing a catalyst ink. As can be seen in the TEM photomicrographs of FIG. 8, after the disintegration treatment, part of the platinum was moved from carbon which is the original carrier to the carbon-based solid acid.
Catalyst Ink Preparation Conditions:

$$\text{Nafion ratio (\% by weight)} = [\text{Nafion solids (weight)}/ \\ \{\text{Electrocatalyst (weight)} + \text{Nafion solids (weight)} + \\ \text{Carbon-based solid acid (weight)}\} \times 100 \text{ (\% by weight)}$$

The catalyst ink was prepared so that the Nafion ratio became 28% by weight.

$$\text{Carbon-based solid acid ratio (\% by weight)} = \\ [\text{Carbon-based solid acid (weight)}/\{\text{Electrocatalyst (weight)} + \\ \text{Nafion solids (weight)} + \text{Carbon-based solid acid (weight)}\}] \times \\ 100 \text{ (\% by weight)}$$

The catalyst ink was prepared so that the carbon-based solid acid ratio became 28% by weight. Specifically, when the weight of the electrocatalyst was 61.1 mg, the amount of the Nafion dispersion was set to 837 μL, the amount of the carbon-based solid acid was set to 38.9 mg, the amount of deionized water was set to 0.6 mL, and the amount of ethanol was set to 5.1 mL. The Nafion dispersion in an amount of 837 μL corresponds to the dispersion containing 38.9 mg of the solids of Nafion.
Catalyst Ink Application Conditions:

The amount of the platinum per 1 cm² of one surface of the GDL, which is 0.3 mg in the catalyst ink application conditions for electricity generation test A, was unchanged, and the application of the catalyst ink was performed so that the weight difference of the GDL between before and after the application became 1.467 mg as a target weight difference, and two GDEs were formed.
Electricity Generation Test C for Fuel Cell:

Electricity generation test C is an example of an electricity generation test which is generally conducted, and is a test conducted for comparison with the present invention. This is a test using Nafion (registered trademark; manufactured by DuPont Inc.) as the electrolyte in the catalyst layer and using no carbon-based solid acid. An electricity generation test was conducted by substantially the same method as in electricity generation test A except that the composition of the catalyst ink, the catalyst ink preparation conditions, and the step of forming an MEA were changed for optimization using Nafion. The changed composition, conditions, and step are described below.

A catalyst ink was prepared using an electrocatalyst which is platinum-supported carbon (manufactured by Tanaka Kikinzoku Kogyo K. K.; platinum content: 46.5% by weight; trade name: "TEC10E50E"), deionized water, ethanol (manufactured by Wako Pure Chemical Industries, Ltd.), and a Nafion dispersion (manufactured by Wako Pure Chemical Industries, Ltd.; trade name: "5% Nafion Dispersion Solution DE521 CS type"). The electrocatalyst, deionized water, ethanol, and Nafion dispersion were placed in a glass vial in this order to prepare a dispersion.
Catalyst Ink Preparation Conditions:

$$\text{Nafion ratio (\% by weight)} = [\text{Nafion solids (weight)}/ \\ \{\text{Electrocatalyst (weight)} + \text{Nafion solids (weight)} + \\ \text{Carbon-based solid acid (weight)}\} \times 100 \text{ (\% by weight)}$$

The catalyst ink was prepared so that the Nafion ratio became 28% by weight. Specifically, when the weight of the electrocatalyst was 61.1 mg, the amount of the Nafion dispersion was set to 837 μL, the amount of deionized water was set to 0.6 mL, and the amount of ethanol was set to 5.1 mL. The Nafion dispersion in an amount of 837 μL corresponds to the dispersion containing 38.9 mg of the solids of Nafion.
Catalyst Ink Application Conditions:

The catalyst ink was prepared and then, using spray coating apparatus V8H, manufactured by Nordson Corporation, the catalyst ink was applied to both surfaces of a 1 cm×1 cm square cut out from the GDL and a 5 cm×5 cm square cut out from Nafion 212 membrane as a solid electrolyte membrane, which was covered with a film made of polyethylene terephthalate (PET) having formed therein a hole of a 1 cm×1 cm square, so that the amount of the platinum became 0.3 mg per 1 cm².
Step of Forming an MEA (Formation of an MEA Through CCM):

The solid electrolyte membrane having the catalyst ink applied was subjected to hot press under conditions at 132° C. and at 0.3 kN for 180 seconds to form a catalyst coated membrane (hereinafter, abbreviated to "CCM"). Subsequently, the GDL which is a gas diffusion layer having the catalyst ink applied to both surfaces of the CCM was subjected to hot press under conditions at 132° C. and at 0.6 kN for 20 seconds to form an MEA. Meanwhile, an MEA was formed through a GDE and an electricity generation test was conducted and, as a result, the MEA formed through a CCM had more excellent results in the electricity generation, and therefore the MEA formed through a CCM was employed as a Comparative Test Example.
Electricity Generation Test D for Fuel Cell:

An electricity generation test was conducted by substantially the same method as in electricity generation test A for fuel cell except that the composition of the catalyst ink, the catalyst ink preparation conditions, the catalyst ink application conditions, and the step of forming an MEA were changed. The changed composition, conditions, and step are described below.
Composition of the Catalyst Ink:

A catalyst ink was prepared using an electrocatalyst which is platinum-supported carbon (manufactured by Tanaka Kikinzoku Kogyo K. K.; platinum content: 46.5% by weight; trade name: "TEC10E50E"), 2-propanol (manufactured by Junsei Chemical Co., Ltd.), the carbon-based solid acid, and a Nafion dispersion (manufactured by FUJIFILM Wako Pure Chemical Corporation, Ltd.; trade name: "5% Nafion Dispersion Solution DE520 CS type"). The electrocatalyst, Nafion dispersion, carbon-based solid acid, and 2-propanol were placed in a glass vial in this order, and the resultant dispersion was irradiated with ultrasonic waves at an output power set to 40% for 20 minutes using ultrasonic homogenizer Smurt NR-50M, manufactured by Microtec Co., Ltd., preparing a catalyst ink.
Catalyst ink Preparation Conditions:

$$\text{Nafion ratio (\% by weight)} = [\text{Nafion solids (weight)}/\\ \{\text{Electrocatalyst (weight)} + \text{Nafion solids (weight)} +\\ \text{Carbon-based solid acid (weight)}\}] \times 100 \text{ (\% by weight)}$$

The catalyst ink was prepared so that the Nafion ratio became 32% by weight.

$$\text{Carbon-based solid acid ratio (\% by weight)} =\\ [\text{Carbon-based solid acid (weight)}/\{\text{Electrocatalyst (weight)} +\\ \text{Nafion solids (weight)} + \text{Carbon-based solid acid (weight)}\}] \times\\ 100 \text{ (\% by weight)}$$

The catalyst ink was prepared so that the carbon-based solid acid ratio became 9% by weight. Specifically, when the weight of the electrocatalyst was 32.9 mg, the amount of the Nafion dispersion was set to 353.8 mg, the amount of the carbon-based solid acid was set to 4.8 mg, and the amount of 2-propanol was set to 1.2 mL. The Nafion dispersion in an amount of 353.8 mg corresponds to the dispersion containing 17.7 mg of the solids of Nafion.

Catalyst Ink Application Conditions:

Using an applicator which can adjust the height to 300 to 400 μm so that the amount of the platinum per 1 cm² became 0.15 mg, the catalyst ink was applied to a polytetrafluoroethylene (hereinafter, abbreviated to "PTFE") sheet having a thickness of 130 μm.

Step of Forming an MEA (Formation of an MEA by a Decal Process):

A 5 cm×5 cm square cut out from Nafion 212 membrane as a solid electrolyte membrane was disposed between the PTFE sheets (1 cm×1 cm) having the catalyst ink applied, and the catalyst layer was heat-transferred to the solid electrolyte membrane under conditions at an upper and lower platen temperature of 140° C. and at 0.6 kN for 180 seconds. Subsequently, carbon paper (manufactured by SGL Carbon Japan Co., Ltd.; trade name: "24BCH") which is a GDL was disposed on both surfaces of the CCM and the resultant material was incorporated into a unit cell. Using a fuel cell evaluation system (AutoPEM, manufactured by Toyo Corporation), evaluation was made at a temperature of 80° C. and at a relative humidity of 95% using a hydrogen gas flow at 1 L/minute and an air gas flow at 2 L/minute, and a current density and a voltage were measured.

Drying Method for the Carbon-Based Solid Acid:

A carbon-based solid acid was placed in an eggplant-shaped flask, and then the flask was set in an evaporator connected to a vacuum pump, and the solid acid was dried at a bath temperature of 90 to 100° C. until it had a constant weight. An alternative method is as follows. A carbon-based solid acid was allowed to stand in a vacuum dryer, and then the dryer was connected to a vacuum pump, and the solid acid was dried at a temperature of 90 to 120° C. until it had a constant weight.

Example 1: Synthesis of Carbon-Based Solid Acid (1)

A carbon-based solid acid (manufactured by Futamura Chemical Co., Ltd.; Taiko solid acid, brand: "CP") in the form of a wet product (5 g; solids content: 24.4%) was allowed to stand in a vacuum dryer, and then dried at a temperature of 100° C. until it had a constant weight, obtaining a dried carbon-based solid acid (1.1 g). The dried carbon-based solid acid (0.51 g) and tetrahydrofuran (20 mL) were successively placed in a reaction vessel. Then, sodium hydride (400 mg, 16.67 mmoL) in the form of a powder was added portion by portion to the reaction vessel, and finally 1,3-propane sultone (2.1 g, 17.0 mmoL) was added to the reaction vessel. The reaction mixture was stirred at 20 to 25° C. for 5 days to perform a reaction. After completion of the reaction, 1 mol/L sulfuric acid (10 mL) was added to the reaction vessel and the resultant mixture was stirred for one hour, and then sulfuric acid (10 mL) was added to the reaction vessel and the resultant mixture was stirred for one hour. The resultant reaction mixture was placed in a centrifuge tube and separated into the supernatant and deposited material using a centrifugal separator. Ion-exchanged water was added to the centrifuge tube, and further an operation of separating the mixture into the supernatant and deposited material using the centrifugal separator was repeated until the supernatant became neutral as measured by checking the hydrogen ion exponent (pH) of the supernatant using pH-test paper. The deposited material was placed in an eggplant-shaped flask, and then the flask was set in an evaporator connected to a vacuum pump, and the material was dried at a bath temperature of 90° C. until it had a constant weight, obtaining carbon-based solid acid (1) in the form of a black solid (0.69 g).

Infrared Absorption (IR):

FIG. 1 shows an IR chart of carbon-based solid acid (1).

Figure 2:
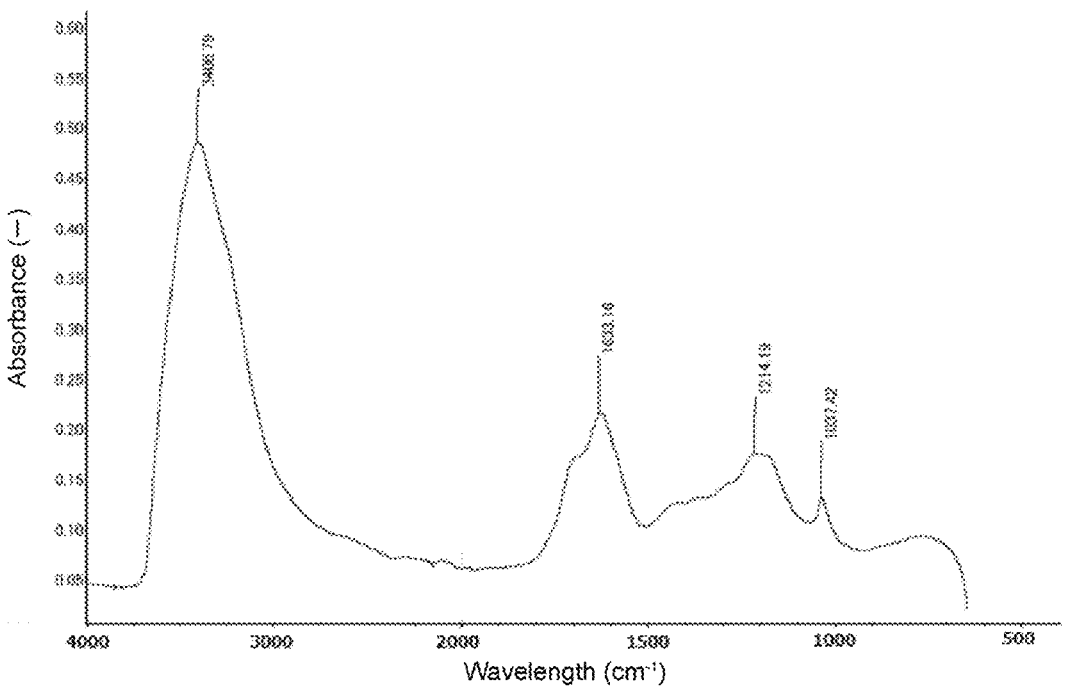
FIG. 2 An IR chart of the dried carbon-based solid acid ("CP", manufactured by Futamura Chemical Co., Ltd.) which is the raw material in Example 1.

FIG. 2 shows an IR chart of the dried carbon-based solid acid ("CP", manufactured by Futamura Chemical Co., Ltd.) which is the raw material in Example 1.

In FIG. 1, a peak of a sulfonic acid group at 1,042 cm$^{-1}$, a peak of —O—CH$_2$— at 1,207 cm$^{-1}$, and a peak of —CH$_2$—CH$_2$— at 2,971 cm$^{-1}$ are found, and, from this, it is apparent that a sulfonic acid group through an oxyalkylene chain is present in carbon-based solid acid (1). In the chart of the raw material in FIG. 2, a peak of —CH$_2$—CH$_2$— is not found.

Example 2: Synthesis of Carbon-Based Solid Acid (2)

A carbon-based solid acid (manufactured by Futamura Chemical Co., Ltd.; Taiko solid acid, brand: "CP for high temperature") in the form of a wet product (10 g; solids content: 37.3%) was placed in an eggplant-shaped flask, and the flask was set in an evaporator connected to a vacuum pump, and the solid acid was dried at a bath temperature of 90° C. until it had a constant weight, obtaining a dried carbon-based solid acid (3.5 g). The dried carbon-based solid acid (2.0 g) and tetrahydrofuran (30 mL) were successively placed in a reaction vessel. Then, sodium hydride (1.2 g, 50.0 mmoL) in the form of a powder was added portion by portion to the reaction vessel, and finally 1,3-propane sultone (3.7 g, 30.3 mmoL) was added to the reaction vessel. The reaction mixture was stirred in an oil bath set at 70° C. for 48 hours to perform a reaction. After completion of the reaction, 2 mol/L sulfuric acid (20 mL) was added to the reaction vessel and the resultant mixture was stirred for one hour, and then sulfuric acid (10 mL) was added to the reaction vessel and the resultant mixture was stirred for one hour. The resultant reaction mixture was placed in a centrifuge tube and separated into the supernatant and deposited material using a centrifugal separator. Then, the deposited material was washed with ion-exchanged water using a vacuum filter having attached silica filter paper until the filtrate became neutral as measured by checking the hydrogen ion exponent (pH) of the filtrate using pH-test paper. The resultant washed product was placed in an eggplant-shaped flask, and then the flask was set in an evaporator connected to a vacuum pump, and the product was dried at a bath temperature of 90° C. until it had a constant weight, obtaining carbon-based solid acid (2) in the form of a black solid (1.68 g).

Figure 3:
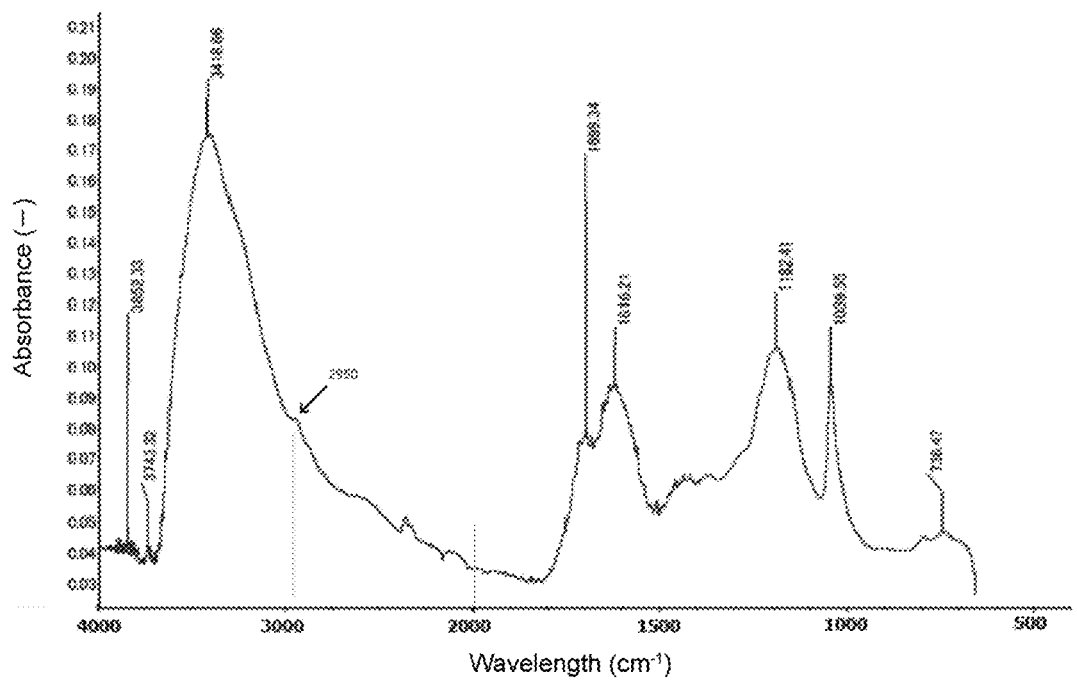
FIG. 3 An IR chart of carbon-based solid acid (2) obtained in Example 2.

Infrared Absorption (IR):

FIG. 3 shows an IR chart of carbon-based solid acid (2).

Figure 4:
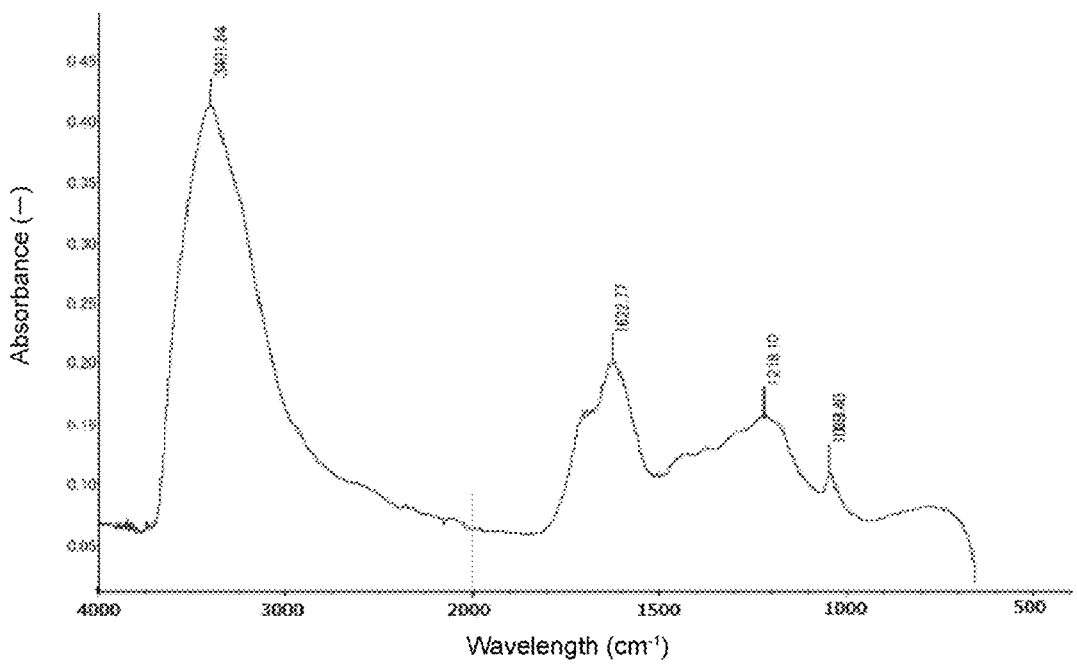
FIG. 4 An IR chart of the dried carbon-based solid acid ("CP for high temperature", manufactured by Futamura Chemical Co., Ltd.) which is the raw material in Example 2.

FIG. 4 shows an IR chart of the dried carbon-based solid acid ("CP for high temperature", manufactured by Futamura Chemical Co., Ltd.) which is the raw material in Example 2.

In FIG. 3, a peak of a sulfonic acid group at 1,040 $cm^{-1}$, a peak of —O—$CH_2$— at 1,182 $cm^{-1}$, and a peak of —$CH_2$—$CH_2$— at around 2,950 $cm^{-1}$ are found, and, from this, it is apparent that a sulfonic acid group through an oxyalkylene chain is present in carbon-based solid acid (2). In the chart of the raw material in FIG. 4, a peak of —O—$CH_2$— and a peak of —$CH_2$—$CH_2$— are not found.

Example 3: Synthesis of Carbon-Based Solid Acid (3)

A carbon-based solid acid (manufactured by Futamura Chemical Co., Ltd.; Taiko solid acid, brand: "ZP for high temperature") in the form of a wet product (15 g; solids content: 38.0%) was placed in an eggplant-shaped flask, and the flask was set in an evaporator connected to a vacuum pump, and the solid acid was dried at a bath temperature of 90° C. until it had a constant weight, obtaining a dried carbon-based solid acid (2.9 g). The dried carbon-based solid acid (2.3 g) and tetrahydrofuran (50 mL) were successively placed in a reaction vessel. Then, sodium hydride (2.0 g, 83.3 mmoL) in the form of a powder was added portion by portion to the reaction vessel, and finally 1,3-propane sultone (7.0 g, 57.3 mmoL) was added to the reaction vessel. The reaction mixture was stirred in an oil bath set at 70° C. for 24 hours to perform a reaction. After completion of the reaction, 2 mol/L sulfuric acid (30 mL) was added to the reaction vessel and the resultant mixture was stirred for one hour, and then sulfuric acid (15 mL) was added to the reaction vessel and the resultant mixture was stirred for one hour. The resultant reaction mixture was placed in a centrifuge tube and separated into the supernatant and deposited material using a centrifugal separator. Then, the deposited material was washed with ion-exchanged water using a vacuum filter having attached silica filter paper until the filtrate became neutral as measured by checking the hydrogen ion exponent (pH) of the filtrate using pH-test paper. The resultant washed product was placed in an eggplant-shaped flask, and then the flask was set in an evaporator connected to a vacuum pump, and the product was dried at a bath temperature of 90° C. until it had a constant weight, obtaining carbon-based solid acid (3) in the form of a black solid (2.02 g).

Figure 5:
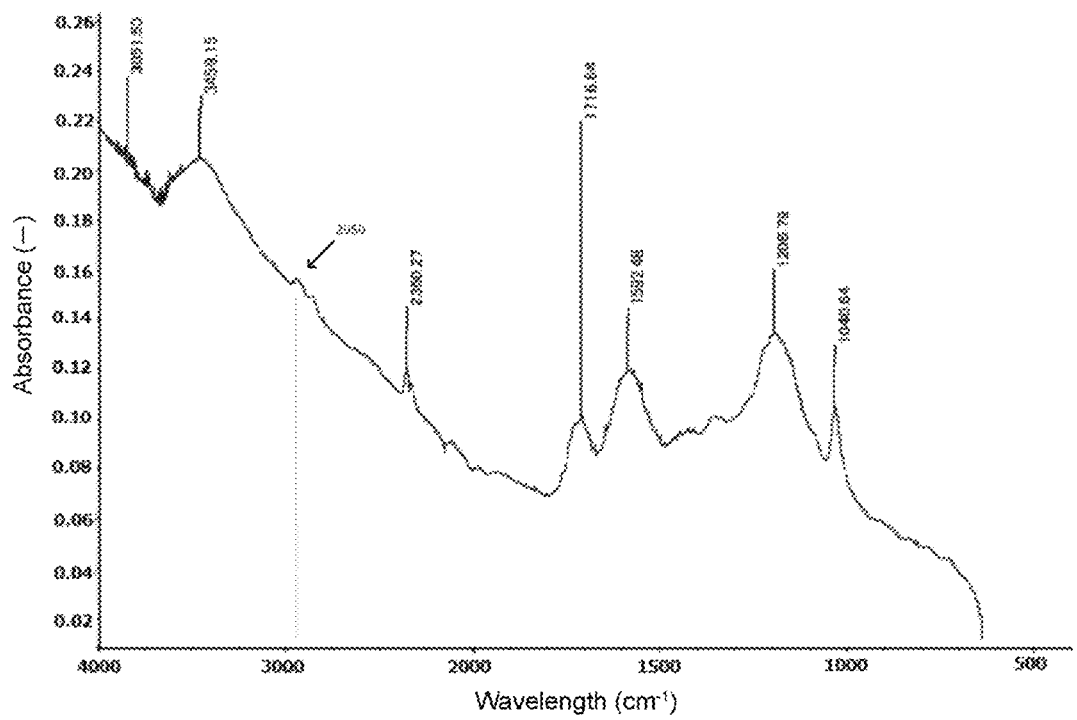
FIG. 5 An IR chart of carbon-based solid acid (3) obtained in Example 3.

Infrared Absorption (IR):

FIG. 5 shows an IR chart of carbon-based solid acid (3).

Figure 6:
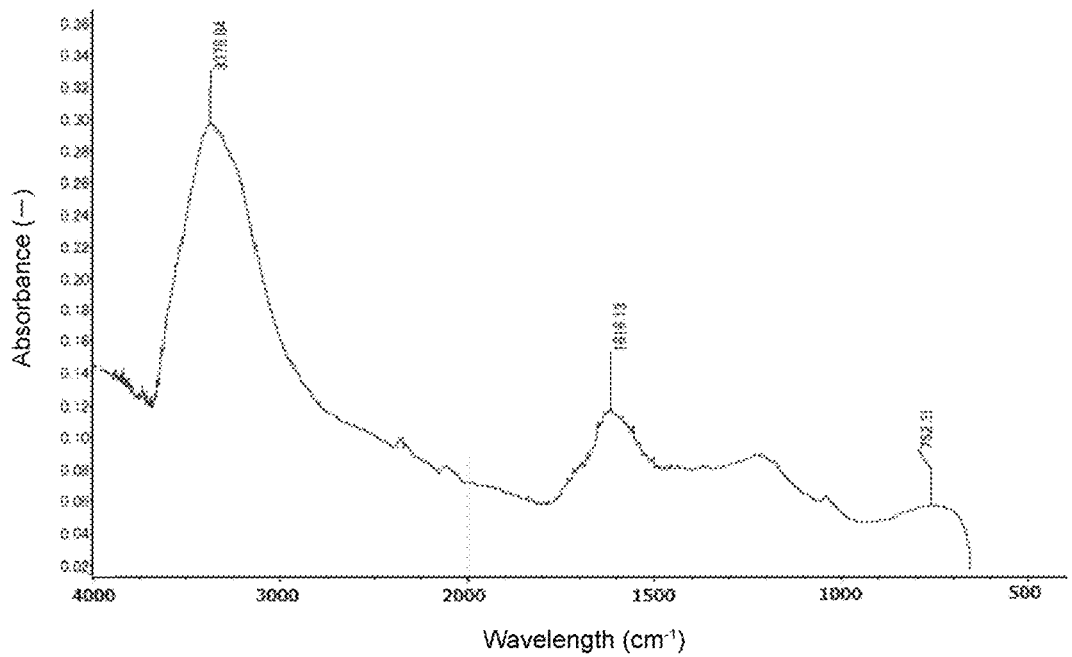
FIG. 6 An IR chart of the dried carbon-based solid acid ("ZP for high temperature", manufactured by Futamura Chemical Co., Ltd.) which is the raw material in Example 3.

FIG. 6 shows an IR chart of the dried carbon-based solid acid ("ZP for high temperature", manufactured by Futamura Chemical Co., Ltd.) which is the raw material in Example 3.

In FIG. 5, a peak of a sulfonic acid group at 1,041 $cm^{-1}$, a peak of —O—$CH_2$— at 1,206 $cm^{-1}$, and a peak of —$CH_2$—$CH_2$— at around 2,950 $cm^{-1}$ are found, and, from this, it is apparent that a sulfonic acid group through an oxyalkylene chain is present in carbon-based solid acid (1). In the chart of the raw material in FIG. 6, a peak of —O—$CH_2$— and a peak of —$CH_2$—$CH_2$— are not found.

Example 4: Synthesis of Carbon-Based Solid Acid (2-a)

A carbon-based solid acid (manufactured by Futamura Chemical Co., Ltd.; Taiko solid acid, brand: "CP for high temperature") in the form of a wet product (21.6 g; solids content: 37.3%) was placed in an eggplant-shaped flask, and the flask was set in an evaporator connected to a vacuum pump, and the solid acid was dried at a bath temperature of 90° C. until it had a constant weight, obtaining a dried carbon-based solid acid (7.1 g). The dried carbon-based solid acid (3.1 g) and tetrahydrofuran (50 mL) were successively placed in a reaction vessel. Then, sodium hydride (4.8 g, 200 mmoL) in the form of a powder was added portion by portion to the reaction vessel, and finally 1,3-propane sultone (24.4 g, 200 mmoL) was added to the reaction vessel.

The reaction mixture was stirred in an oil bath set at 80° C. for 24 hours to perform a reaction. After completion of the reaction, 2 mol/L sulfuric acid (80 mL) was added to the reaction vessel and the resultant mixture was stirred at 20 to 25° C. for 2 hours, and then sulfuric acid (20 mL) was added to the reaction vessel and the resultant mixture was further stirred at 20 to 25° C. for 2 hours. The resultant reaction mixture was placed in a centrifuge tube and separated into the supernatant and deposited material using a centrifugal separator. Then, the deposited material was washed with ion-exchanged water using a vacuum filter having attached silica filter paper until the filtrate became neutral as measured by checking the hydrogen ion exponent (pH) of the filtrate using pH-test paper. The resultant washed product was placed in an eggplant-shaped flask, and then the flask was set in an evaporator connected to a vacuum pump, and the product was dried at a bath temperature of 90° C. until it had a constant weight, obtaining carbon-based solid acid (2-a) in the form of a black solid (4.4 g).

Example 5: Synthesis of Carbon-Based Solid Acid (2-b)

The dried carbon-based solid acid (1.4 g) obtained in Example 4 and 1,3-propane sultone (33.3 g, 273 mmoL) were successively placed in a reaction vessel. Then, sodium hydride (0.65 g, 27.1 mmoL) in the form of a powder was added to the reaction vessel. The reaction mixture was stirred in an oil bath set at 120° C. for 24 hours to perform a reaction. After completion of the reaction, water (20 mL) and concentrated sulfuric acid (3 mL) were added to the reaction vessel and the resultant mixture was stirred at 20 to 25° C. for 2 hours. The resultant reaction mixture was washed with ion-exchanged water using a vacuum filter having attached silica filter paper until the filtrate became neutral as measured by checking the hydrogen ion exponent (pH) of the filtrate using pH-test paper. The resultant washed product was placed in an eggplant-shaped flask, and then the flask was set in an evaporator connected to a vacuum pump, and the product was dried at a bath temperature of 90° C. until it had a constant weight, obtaining carbon-based solid acid (2-b) in the form of a black solid (1.8 g).

Comparative Test Example 1: Electricity Generation Test 1 for Fuel Cell

Using the carbon-based solid acid (manufactured by Futamura Chemical Co., Ltd.; Taiko solid acid, brand: "CP")

dried by the above-mentioned drying method, the above-mentioned electricity generation test A for fuel cell was conducted. The results of the measurement of voltage and current density are shown in Table 1. With respect to the application of the catalyst ink used in electricity generation test 1, the catalyst ink discharge outlet of the spray coating apparatus was clogged, and therefore the spray coating apparatus was dismantled and the discharge outlet was cleaned by ultrasonic cleaning, completing the ink application operation.

TABLE 1

| Current density (A/cm$^2$) | Voltage (V) |
| --- | --- |
| 0.20 | 0.59 |
| 0.40 | 0.49 |
| 0.60 | 0.40 |
| 0.80 | 0.28 |

Test Example 1: Electricity Generation Test 2 for Fuel Cell

Using carbon-based solid acid (1) synthesized in Example 1, the above-mentioned electricity generation test A for fuel cell was conducted. The results of the measurement of voltage and current density in Test Example 1 and Comparative Test Example 1 are shown in Table 2. With respect to the application of the catalyst ink used in electricity generation test 2, no clogging of the catalyst ink discharge outlet of the spray coating apparatus occurred.

TABLE 2

| Electricity generation test Carbon-based solid acid Current density (A/cm$^2$) | Test Example 1 Carbon-based solid acid (1) Voltage (V) | Comparative Test Example 1 Carbon-based solid acid "CP" Voltage (V) |
| --- | --- | --- |
| 0.20 | 0.61 | 0.59 |
| 0.40 | 0.52 | 0.49 |
| 0.60 | 0.43 | 0.40 |
| 0.80 | 0.35 | 0.28 |

With respect to the electricity generation properties, a comparison was made between Test Example 1 and Comparative Test Example 1 in which the electricity generation test for fuel cell was conducted under substantially the same conditions except that the type of the carbon-based solid acid was different. Test Example 1 had more excellent results.

Comparative Test Example 2: Electricity Generation Test 3 for Fuel Cell

Using the carbon-based solid acid (manufactured by Futamura Chemical Co., Ltd.; Taiko solid acid, brand: "CP for high temperature") dried by the above-mentioned drying method, the above-mentioned electricity generation test B for fuel cell was conducted. The results of the measurement of voltage and current density are shown in Table 3. With respect to the application of the catalyst ink used in electricity generation test 3, clogging of the catalyst ink discharge outlet of the spray coating apparatus was such slight that an operation of the spray coating apparatus to control the amount of the discharged ink coped with the clogging. The ink application operation was completed without dismantling the spray coating apparatus.

TABLE 3

| Current density (A/cm$^2$) | Voltage (V) |
| --- | --- |
| 0.20 | 0.51 |
| 0.30 | 0.32 |

Test Example 2: Electricity Generation Test 4 for Fuel Cell

Using carbon-based solid acid (2) synthesized in Example 2, the above-mentioned electricity generation test B for fuel cell was conducted. The results of the measurement of voltage and current density in Test Example 2 and Comparative Test Example 2 are shown in Table 4. With respect to the application of the catalyst ink used in electricity generation test 4, no clogging of the catalyst ink discharge outlet of the spray coating apparatus occurred.

TABLE 4

| Electricity generation test Material used in catalyst layer Current density (A/cm$^2$) | Test Example 2 Nafion and carbon-based solid acid (2) Voltage (V) | Comparative Test Example 2 Nafion and carbon-based solid acid "CP for high temperature" Voltage (V) |
| --- | --- | --- |
| 0.20 | 0.73 | 0.51 |
| 0.30 | 0.70 | 0.32 |
| 0.40 | 0.66 | No measurement result |
| 0.60 | 0.61 | No measurement result |
| 0.80 | 0.55 | No measurement result |
| 1.00 | 0.49 | No measurement result |
| 1.20 | 0.42 | No measurement result |
| 1.40 | 0.34 | No measurement result |

With respect to the electricity generation properties, a comparison was made between Test Example 2 and Comparative Test Example 2 in which the electricity generation test for fuel cell was conducted under substantially the same conditions except that the type of the carbon-based solid acid was different. Test Example 2 had more excellent results.

Test Example 3: Electricity Generation Test 5 for Fuel Cell

Using carbon-based solid acid (3) synthesized in Example 3, the above-mentioned electricity generation test B for fuel cell was conducted. The results of the measurement of voltage and current density are shown in Table 5. With respect to the application of the catalyst ink used in electricity generation test 5, no clogging of the catalyst ink discharge outlet of the spray coating apparatus occurred.

TABLE 5

| Current density (A/cm$^2$) | Voltage (V) |
| --- | --- |
| 0.20 | 0.71 |
| 0.30 | 0.67 |
| 0.40 | 0.63 |
| 0.60 | 0.57 |

TABLE 5-continued

| Current density (A/cm$^2$) | Voltage (V) |
|---|---|
| 0.80 | 0.50 |
| 1.00 | 0.44 |
| 1.20 | 0.37 |
| 1.40 | 0.30 |

Comparative Test Example 3: Electricity Generation Test 6 for Fuel Cell

The above-mentioned electricity generation test C for fuel cell was conducted, wherein electricity generation test C is an example of an electricity generation test which is generally conducted, and which is a test using only Nafion (registered trademark; manufactured by DuPont Inc.) as the electrolyte in the catalyst layer. The results of the measurement of voltage and current density in Comparative Test Example 3 and Test Examples 2 and 3 are shown in Table 6.

TABLE 6

| Electricity generation test Material used in catalyst layer Current density (A/cm$^2$) | Comparative Test Example 3 Nafion only (Reference example) Voltage (V) | Test Example 2 Nafion and carbon-based solid acid (2) Voltage (V) | Test Example 3 Nafion and carbon-based solid acid (3) Voltage (V) |
|---|---|---|---|
| 0.20 | 0.74 | 0.73 | 0.71 |
| 0.30 | 0.71 | 0.70 | 0.67 |
| 0.40 | 0.67 | 0.66 | 0.63 |
| 0.60 | 0.62 | 0.61 | 0.57 |
| 0.80 | 0.55 | 0.55 | 0.50 |
| 1.00 | 0.47 | 0.49 | 0.44 |
| 1.20 | 0.36 | 0.42 | 0.37 |
| 1.40 | 0.18 | 0.34 | 0.30 |

With respect to the electricity generation properties, a comparison was made between Comparative Test Example 3, which is an example of an electricity generation test which is generally conducted, and Test Examples 2 and 3 of the present invention. Test Examples 2 and 3 of the present invention were slightly poor in the results in the current density region of 0.20 to 0.80 (A/cm$^2$), but had more excellent results than those in Comparative Test Example 3 in the high current region of 1.00 to 1.40 (A/cm$^2$).

Test Example 4: Electricity Generation Test 7 for Fuel Cell

Using carbon-based solid acid (3) synthesized in Example 3, the above-mentioned electricity generation test D for fuel cell was conducted. The results of the measurement of voltage and current density are shown in Table 7. With respect to the application of the catalyst ink used in electricity generation test 7, a portion in an aggregate form was not found.

TABLE 7

| Current density (A/cm$^2$) | Voltage (V) |
|---|---|
| 0.04 | 0.82 |
| 0.06 | 0.80 |
| 0.10 | 0.78 |

TABLE 7-continued

| Current density (A/cm$^2$) | Voltage (V) |
|---|---|
| 0.20 | 0.74 |
| 0.40 | 0.68 |
| 0.60 | 0.63 |
| 0.80 | 0.58 |
| 1.00 | 0.51 |
| 1.20 | 0.46 |
| 1.40 | 0.39 |
| 1.61 | 0.30 |
| 1.80 | 0.20 |

INDUSTRIAL APPLICABILITY

The carbon-based solid acid of the present invention is advantageously used as, for example, an electrolyte material for a fuel cell (for example, an electrolyte material used in a catalyst layer, a solid electrolyte membrane, and a catalyst carrier), and is expected to improve the electricity generation properties and durability of a fuel cell.

Further, when the carbon-based solid acid of the present invention is used in a catalyst ink, the catalyst ink can be applied without suffering aggregation, and the frequency of clogging of a nozzle of the ink application apparatus can be reduced, and therefore it is expected that the efficiency of the mass-production of fuel cell is improved and the quality of the produced fuel cell is stabilized.

DESCRIPTION OF REFERENCE NUMERALS

100: Fuel cell
101: Gas diffusion layer
103: Anode catalyst layer
105: Cathode catalyst layer
107: Solid electrolyte membrane
109: Separator

The invention claimed is:
1. A carbon-based solid acid comprising a carbon material having a sulfonic acid group through a linker, which has a structure represented by the following formula (1):

[Chemical formula 1]

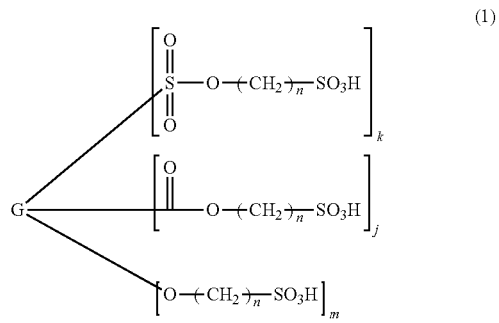

(1)

wherein G represents graphene optionally having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure, k represents an integer of 1 to 5, j represents an integer of 1 to 3, m represents an integer of 1 to 10, and n represents an integer of 2 to 4.

2. A catalyst layer for a fuel cell, containing the carbon-based solid acid according to claim 1.

3. The catalyst layer for a fuel cell according to claim 2, wherein the carbon-based solid acid is a kind of electrolyte and a kind of catalyst carrier.

4. The catalyst layer for a fuel cell according to claim 2, which further contains a perfluorosulfonic acid polymer.

5. The catalyst layer for a fuel cell according to claim 2, which further contains a binder.

6. A method for producing the carbon-based solid acid according to claim 1, comprising the step of reacting a carbon material having at least one member selected from the group consisting of a hydroxyl group, a carboxyl group, a carbonyl group, a formyl group, a sulfonic acid group, an oxysulfonic acid group, a carboxylic acid anhydride structure, a chromene structure, a lactone structure, an ester structure, and an ether structure, and a sultone with each other.

7. The method of producing the carbon-based solid acid according to claim 6, wherein the sultone is at least one member selected from the group consisting of 1,3-propane sultone, 2,4-butane sultone, 1,4-butane sultone, 1,3-butane sultone, and 2,4-pentane sultone.

8. The method of producing the carbon-based solid acid according to claim 6, wherein the carbon material has a graphene structure in at least part thereof.

9. A composition containing the carbon-based solid acid according to claim 1 and a perfluorosulfonic acid polymer.

10. A method for producing a carbon-based solid acid having a catalyst supported, comprising subjecting a catalyst layer forming composition containing the carbon-based solid acid according to claim 1 and a catalyst to disintegration treatment.

11. The method for producing a carbon-based solid acid having a catalyst supported according to claim 10, which comprises subjecting a catalyst layer forming composition containing the carbon-based solid acid and a catalyst carrier having a catalyst supported thereon to disintegration treatment.

12. A catalyst layer for a fuel cell, containing a carbon-based solid acid comprising a carbon material having a sulfonic acid group according to claim 1 and a catalyst, wherein the catalyst is supported on the carbon-based solid acid.

13. A method for producing a carbon-based solid acid having a catalyst supported, comprising subjecting a catalyst layer forming composition containing the carbon-based solid acid according to claim 1 and a catalyst to disintegration treatment.

* * * * *